(12) United States Patent
Suzuki et al.

(10) Patent No.: US 7,020,049 B2
(45) Date of Patent: Mar. 28, 2006

(54) APPARATUS USING A DETECTED LIGHT BEAM POWER AT A START OF CHANGE OF A MAGNETIZED STATE FOR SETTING A REPRODUCING LIGHT BEAM

(75) Inventors: Toshihiko Suzuki, Kanagawa (JP); Katsumi Arisaka, Kanagawa (JP); Takashi Inoue, Osaka (JP); Toshio Matsumoto, Kyoto (JP)

(73) Assignees: Canon Kabushiki Kaisha, Tokyo (JP); Matsushita Electric Industrial Co., Ltd., Osaka (JP)

( * ) Notice: Subject to any disclaimer, the term of this patent is extended or adjusted under 35 U.S.C. 154(b) by 127 days.

(21) Appl. No.: 10/421,701

(22) Filed: Apr. 24, 2003

(65) Prior Publication Data
US 2004/0017736 A1    Jan. 29, 2004

(30) Foreign Application Priority Data
Apr. 26, 2002    (JP) .............................. 2002-127028

(51) Int. Cl.
  *G11B 11/00*    (2006.01)
(52) U.S. Cl. .................................................. 369/13.26
(58) Field of Classification Search ............. 369/13.26, 369/13.27, 13.24, 13.28, 13.35, 116
See application file for complete search history.

(56) References Cited

U.S. PATENT DOCUMENTS

| | | | |
|---|---|---|---|
| 5,055,351 A | 10/1991 | Fujimoto et al. ........... 428/336 |
| 5,132,173 A | 7/1992 | Hashimoto et al. .......... 428/336 |
| 5,315,600 A | 5/1994 | Iwamura et al. ........... 371/37.6 |
| 5,475,666 A * | 12/1995 | Ito et al. ................... 369/13.27 |
| 5,517,471 A | 5/1996 | Ashinuma et al. ............. 369/13 |
| 5,638,229 A | 6/1997 | Shingu et al. ............. 360/72.3 |
| 5,703,841 A * | 12/1997 | Hiroki ...................... 369/13.24 |
| 5,796,704 A | 8/1998 | Nanba et al. ................ 369/116 |
| 5,808,972 A * | 9/1998 | Matsumoto et al. ..... 369/13.27 |
| 5,825,724 A * | 10/1998 | Matsumoto et al. ..... 369/13.27 |
| 5,831,943 A * | 11/1998 | Kurita et al. ............. 369/13.27 |
| 5,862,103 A * | 1/1999 | Matsumoto et al. ..... 369/13.27 |
| 5,982,714 A * | 11/1999 | Koda ....................... 369/13.24 |
| 6,041,024 A * | 3/2000 | Ishii ........................ 369/13.47 |
| 6,058,077 A * | 5/2000 | Miyaoka .................. 369/13.24 |
| 6,125,084 A * | 9/2000 | Sukeda et al. ........... 369/13.27 |
| 6,144,628 A | 11/2000 | Matsuura ..................... 369/58 |
| 6,356,515 B1 * | 3/2002 | Kumita et al. ........... 369/13.26 |
| 6,519,212 B1 * | 2/2003 | Ashinuma ................ 369/13.26 |
| 6,751,166 B1 * | 6/2004 | Fujita et al. ............. 369/13.26 |

FOREIGN PATENT DOCUMENTS

JP    8-221760    8/1996
JP    9-282729    10/1997

* cited by examiner

*Primary Examiner*—Tan Dinh

(57) ABSTRACT

In a magneto-optical disk drive using a domain wall moving magneto-optical recording medium, a test-writing operation adjustment to deal wit dynamic fluctuation factors is minimized, and a reproducing or recording laser power is automatically optimized. A power of a light beam by which a domain wall starts to move is detected, and a power of a laser used to reproduce or record an information is corrected based on a change in the domain wall movement starting power. As the domain wall movement starting power, it is possible to use, for example, when the power of a light beam is varied, such a power as to maximize a rate of change of the amplitude of a reproducing signal.

11 Claims, 16 Drawing Sheets

FIG. 4
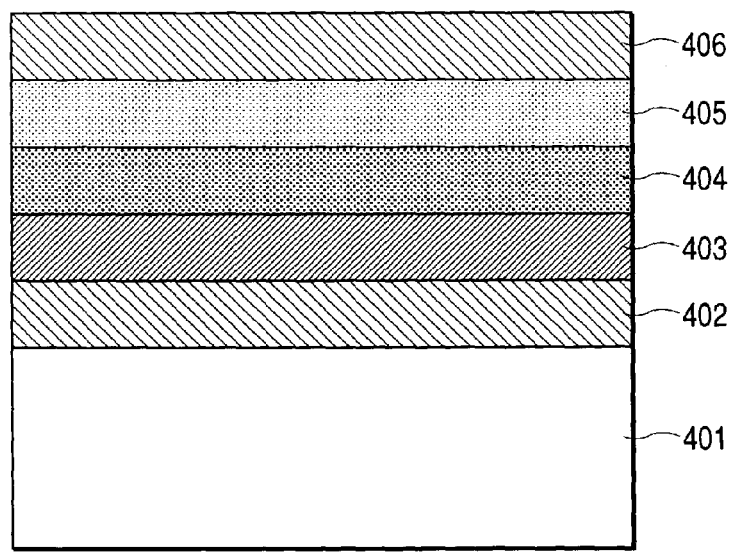
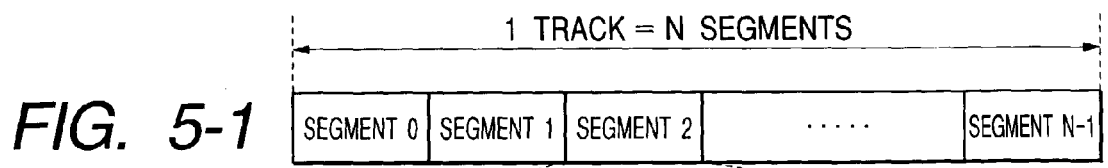
FIG. 5-1
FIG. 5-2

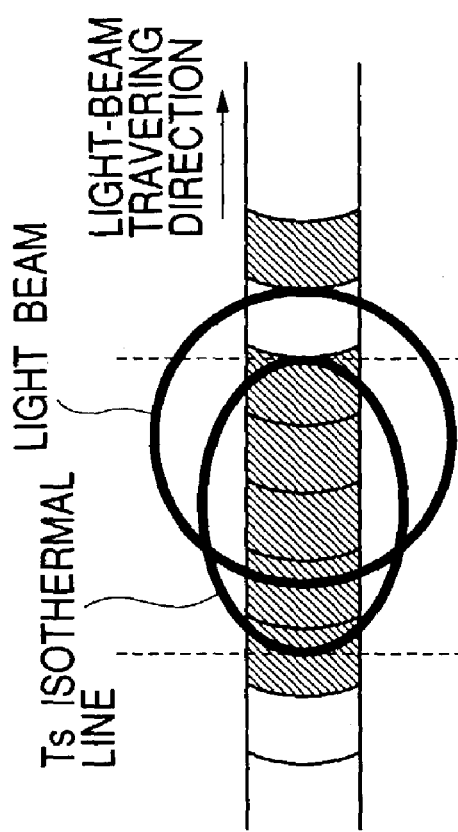
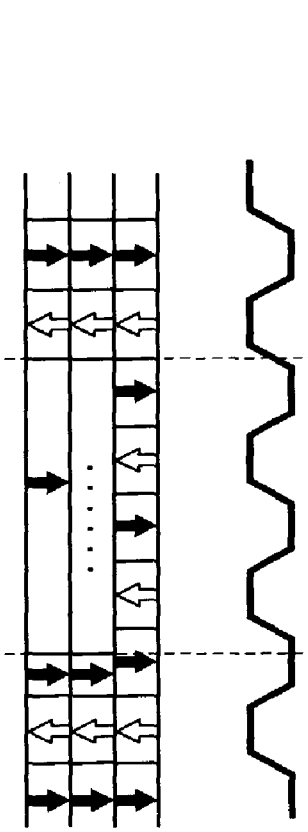
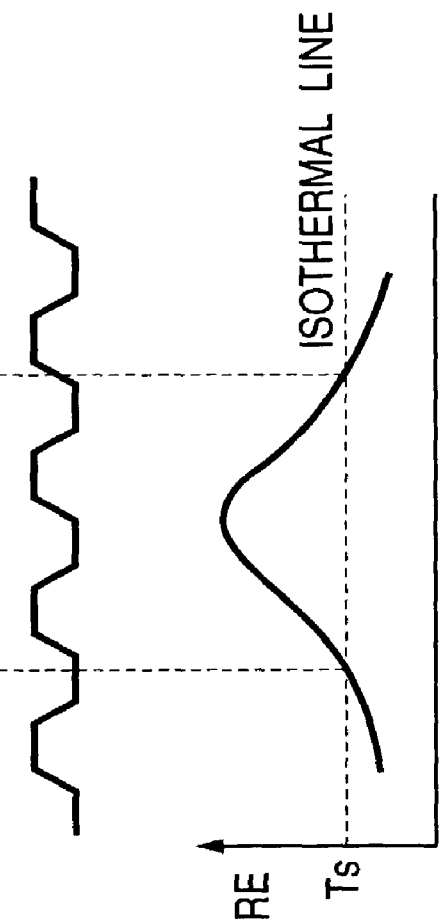
FIG. 7-1
FIG. 7-2
FIG. 7-3
FIG. 7-4

REPRODUCTION ENVELOPE

+40dB
(100%)

PEAK-BOTTOM
WAVE DETECTION

APPARATUS USING A DETECTED LIGHT BEAM POWER AT A START OF CHANGE OF A MAGNETIZED STATE FOR SETTING A REPRODUCING LIGHT BEAM

BACKGROUND OF THE INVENTION

1. Field of the Invention

The present invention relates to a recording/reproducing apparatus for a magneto-optical recording medium for recording or reproducing an information by using a laser beam, particularly to a magneto-optical recording/reproducing apparatus having an adjusting function for optimizing a reproducing or recording laser power in a method of recording/reproducing a minute mark of an optical detection limit or less by moving a domain wall of a recording magnetic domain known as domain wall displacement detection (DWDD).

2. Related Background Art

A magneto-optical disk drive is mainly used as a peripheral unit of a personal computer or the like, which has been developed as a large-capacity data storage unit because the medium can easily be carried and in which data can be repeatedly recorded or reproduced. Particularly, the drive has the superiority in data accessibility which cannot be realized by a tape-shaped recording medium, for example, it is possible to intermittently record continuous data in the drive or it is possible to reproduce an optional part from continuously long data at a high speed at random. Moreover, nowadays, a magneto-optical drive is further continuously improved in density and transfer rate and therefore, a purpose for a digital recording/reproducing apparatus for fine image information is opened as the main axis of multimedia unit.

Thus, in the case of a magneto-optical disk drive achieving a high speed and high density, it is important to adjust or optimize a laser power when recording or reproducing data. The optimum laser power is influenced by the track width, pitch, or groove shape of a disk (medium), or material sensitivity or uniformity in a radial direction of a recording magnetic film. In general, this difference depending on products is specific to a disk. When a disk differs, the optimum laser power differs. Moreover, even in the case of the same disk, aging occurs due to the warpage of the disk, contamination of the surface of the disk, or increase of use frequency or storage state of the disk. Therefore, because effective values of a laser power are changed, the optimum value of the laser power fluctuates. Moreover, in the recording/reproducing process of the magneto-optical disk, temperature is an important parameter and an optimum recording power or reproducing power is changed due to the temperature of the disk.

A laser power has been optimized so far by performing test-writing (trial recording/reproducing) in a test region formed at a predetermined position of a medium. For example, tests are repeated by preparing the data having a predetermined signal pattern and repeatedly recording and reproducing the data a plurality of times while changing laser powers. A laser power is optimized by considering the signal quality at each laser power in accordance with the jitter or error rate of obtained reproducing signals. The above optimization is executed whenever an apparatus is started or disks are changed, or every predetermined cycle.

Moreover, a method is proposed which optimizes a laser power in accordance with a measured temperature change by providing a temperature measuring function in a unit and thereby monitoring the temperature in an apparatus or surface temperature of a medium.

In recent years, various techniques are proposed for optimization of a laser power. Japanese Patent Application Laid-Open No. 8-221760 discloses a technique of obtaining an optimum reproducing laser power by slowly raising a reproducing laser power from a low power before starting a reproducing operation and thereby detecting a point at which a reproducing signal amplitude is saturated, and correcting the laser power by a predetermined value. Moreover, Japanese Patent Application Laid-Open No. 9-282729 discloses a technique of obtaining an optimum reproducing laser power by slowly raising a reproducing laser power from a low power before starting a reproducing operation and thereby detecting a point at which a reproducing signal amplitude rapidly rises, and correcting the laser power by a predetermined value.

These improved techniques make it possible to compensate a medium temperature change or the like caused by a temporal shift under actual reproduction for a prior art of obtaining an optimum reproducing power in a predetermined test region and thereby perform more optimum power control.

As the density of a recording medium and the transfer rate of data are improved, the above magneto-optical disk is decreased in diameter and it is studied to apply the disk to a compact mobile unit such as a disk camera for handling a large-capacity very-fine image information or disk camcorder. To such a unit for mobile purpose, in order to meet the requirement for portability in the outdoors, operability, size reduction, weight reduction, or the like, ultimate packing design is applied. Moreover, the airtightness in an apparatus is improved and the inside of a unit in use is brought into a considerably high temperature environment. Furthermore, the unit is exposed to a sudden environmental change such as indoor and outdoor traffic, temperature change, and humidity change.

Therefore, the magneto-optical disk drive is required to have an apparatus reliability to an environment change which is far higher than those for conventional computer peripheral units. Particularly, in the case of conventional computer peripheral units, a laser power can be optimized as needed by performing test-writing at a proper cycle. However, because the trends of magneto-optical disk drive markets are changed, a predetermined processing must be performed in real time when handing image information captured at a constant high-speed data rate. Therefore, frequent occurrence of adjustment time of test-writing causes critical traffic to increase in system processing.

This problem cannot be easily solved even by using the techniques disclosed in Japanese Patent Application Laid-Open Nos. 8-221760 and 9-282729 mentioned above. This is because each of the above techniques attains optimization of a laser power by monitoring the saturation or sudden rise of a signal reproducing amplitude value and providing a constant value for the amplitude value. However, the conventional power adjusting method of applying a uniform correction in accordance with a change in reproducing signal amplitudes cannot follow various fluctuation factors and therefore, it is impossible to accurately achieve optimization of a laser power. Specifically, static fluctuation factors include a difference in characteristics of individual disks (dispersion), and an irregularity in sensitivity characteristic (ununiformity) may occur at a specific portion of a disk. Moreover, dynamic fluctuation factors may include an environmental temperature change or a temporary warpage of a disk due to a sudden change of such temperature/humidity.

Furthermore, a reflecting surface of a disk may be locally contaminated. Furthermore, the durability of a disk may change with the elapse of time. When any one of the above fluctuations occurs, optimum laser powers are not always equally determined even if change points of reproducing signal amplitudes are the same.

Therefore, the conventional techniques of correcting a laser power by a predetermined constant value in accordance with a change point of reproducing signal amplitudes has a problem that an adjustment accuracy becomes insufficient and therefore, a laser power cannot be optimized.

SUMMARY OF THE INVENTION

It is, therefore, an object of the present invention to provide a magneto-optical recording/reproducing apparatus that can always optimize a reproducing or recording laser-power intensity even for not only static fluctuation factors such as a difference in characteristics of individual disks but also severe dynamic fluctuation factors caused by ultra-miniaturization or mobile environmental use of an apparatus.

According to the present invention, there is provided a magneto-optical recording/reproducing apparatus for reproducing an information by irradiating a magneto-optical recording medium with a light beam in a spot fashion to change a magnetized state in the spot, comprising:

means for detecting a light beam power by which a change in the magnetized state starts;

means for learning a reproducing light beam power; and means for calculating and storing the difference or ratio between the magnetized-state-change-starting light beam power and the reproducing light beam power obtained through the learning, wherein when resetting the reproducing light beam power, the reproducing light beam is set by newly detecting the magnetized-state-change-starting light beam power and using the detected light beam power and the stored difference or ratio.

According to the present invention, there is further provided a magneto-optical recording/reproducing apparatus for reproducing an information by irradiating a magneto-optical recording medium with a light beam in a spot fashion to change a magnetized state in the spot and recording an information while irradiating the medium with a light beam, comprising:

means for learning a recording light beam power; and means for calculating and storing the difference or ratio between a light beam power for starting a change in the magnetized state and the recording light beam power obtained through the learning, wherein when resetting the recording light beam power, the recording light beam is set by newly detecting the magnetized-state-change-starting light beam power and using the detected light beam power and the stored difference or ratio.

BRIEF DESCRIPTION OF THE DRAWINGS

FIG. 4 is a schematic sectional view showing an example of the structure of a disk (magneto-optical recording medium) to which the present invention is applied;

FIGS. 5-1 and 5-2 are views for illustrating a track data structure of a disk;

FIGS. 7-1, 7-2, 7-3 and 7-4 are views for illustrating the principle of domain wall movement/reproduction;

FIGS. 13-1 and 13-2 are flowcharts showing operations of a third embodiment of the present invention;

FIGS. 16-1 and 16-2 are views for illustrating detection of the amplitude of a reproducing signal;

FIGS. 17-1 and 17-2 are views for illustrating the reproduction principle and characteristics of an MSR medium;

DESCRIPTION OF THE PREFERRED EMBODIMENTS

Preferred embodiments of the present invention are described below by referring to the accompanying drawings.

Figure 2:
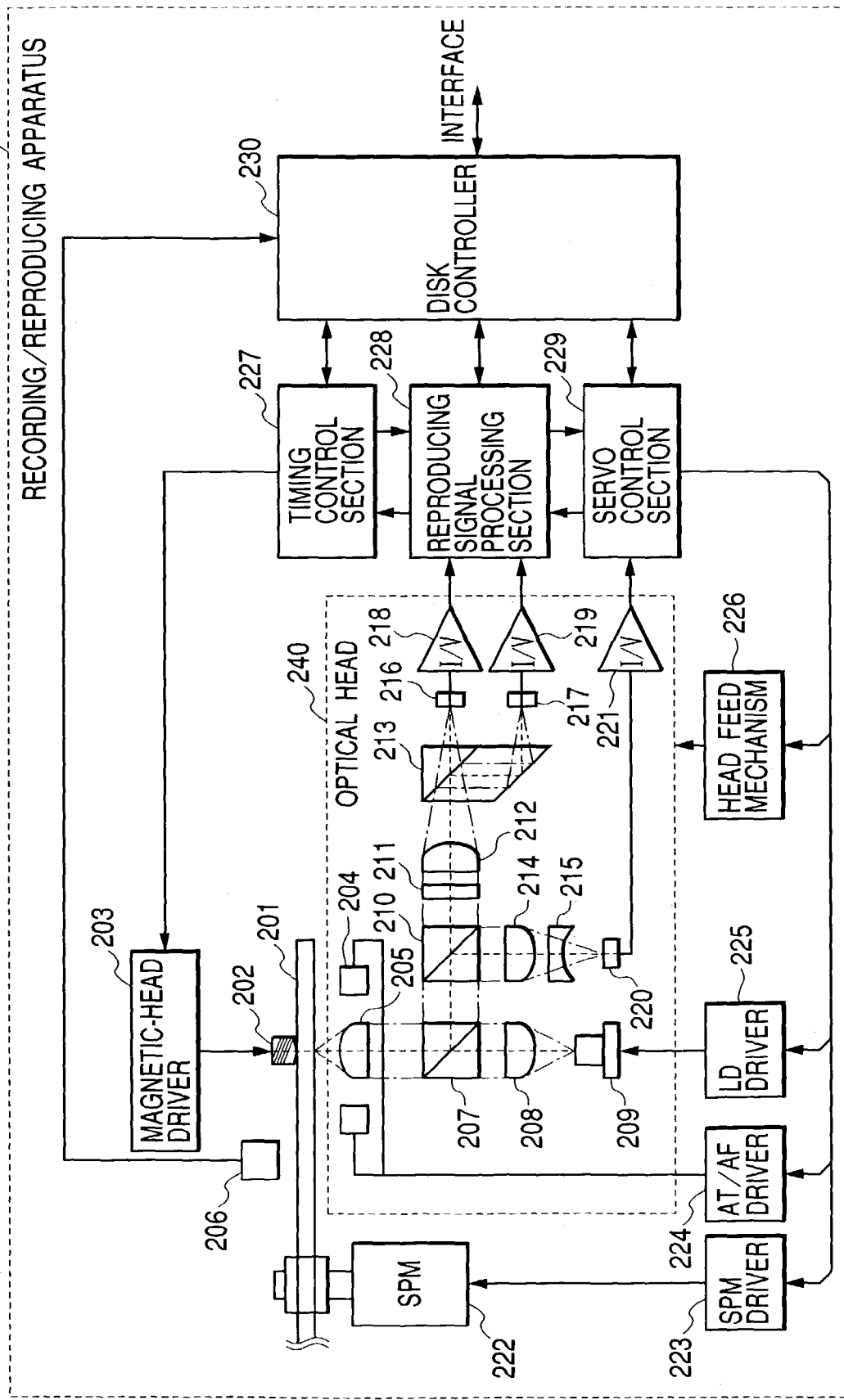
FIG. 2 is a functional block diagram of a recording/reproducing apparatus.

Adjustment of a reproducing or recording power by the present invention is applied to a recording/reproducing apparatus 200 as shown in FIG. 2.

(Components and a Series of Operations of Recording/Reproducing Apparatus 200)

FIG. 2 is a functional block diagram showing a configuration of a recording/reproducing apparatus of an embodiment of the present invention. The recording/reproducing apparatus 200 records or reproduces an information in or from a domain wall moving magneto-optical recording medium 201 (hereafter referred to as "disk"), which is constituted as a magneto-optical disk drive. In this case, the recording region of the disk 201 is divided into a plurality of zones in the radial direction. Moreover, the rotation of the disk 201 is controlled by a servo control section 229 so that a linear velocity becomes constant in the zones. The servo control section 229 drives a spindle motor (SPM) 222 through a spindle-motor driver 223.

A magnetic head 202 is set above the upper face of the disk 201 adjacently to the disk 201. The magnetic head 202 generates a magnetic field modulated in accordance with a recording signal through driving by a magnetic-head driver 203 to apply the magnetic field to the disk 201. The magnetic-head driver 203 supplies a driving current to the magnetic head 202 in accordance with a logic signal supplied from a timing control section 227. Moreover, an optical head 240 is set below the lower face of the disk 201 so as to face the magnetic head 202. A semiconductor laser 209 is set in the optical head 240.

The semiconductor laser 209 is used for recording, reproducing, and servo control and has a wavelength of 660 nm. The semiconductor laser 209 is power-controlled by the serve control section 229 and driven by an LD (laser diode) driver 225.

A laser beam emitted from the semiconductor laser 209 is converted into a parallel light flux by a converging lens 208. Then, the light flux enters an objective lens 205 after passing through a beam splitter 207. The incident light flux is narrowed down by the objective lens 205 and irradiated to the disk 201 as a micro light spot.

A part of the laser beam irradiated to the disk 201 is reflected from the disk surface and enters the beam splitter 207 through the objective lens 205. The incident light flux is reflected from the beam splitter 207 and moreover divided into a servo-detection optical system and a signal-detection optical system by the beam splitter 210. The servo-detection optical system is constituted by a converging lens 214, focus-control cylindrical lens 215, servo-detection optical sensor 220, and I/V conversion amplifier 221. An output signal of the servo-detection optical sensor 220 constituted by a PIN photodiode is converted from a photoelectric current into a voltage signal by the I/V conversion amplifier 221 and sent to the servo control section 229.

The servo control section 229 has a circuit for detecting a focus error signal and a tracking error signal in accordance with a servo detection signal to control an AT(automatic tracking)/AF(autofocusing) driver 224 based on the obtained focus error signal and tracking error signal.

An actuator for driving the objective lens 205 in the focus direction and tracking direction is set in the optical head 240 and moreover, a driving coil 204 is set in it. The AT/AF driver 224 drives the driving coil 204 in accordance with a focus error signal and tracking error signal and adjusts the position of the objective lens 205 in the focus and tracking directions. Thus, the driver 224 keeps focusing of a light spot on the rotating disk 201 by the semiconductor laser 209 to perform tracking for an information track. Moreover, the driver 224 controls a head feed mechanism 226 to perform seek control of the optical head 240.

The signal-detection optical system is constituted by a half-wave plate 211, converging lens 212, a polarizing beam splitter 213, signal-detection optical sensors 216 and 217, and I/V conversion amplifiers 218 and 219. The polarization direction of the light reflected from a beam splitter 210 is rotated by 45° with the half-wave plate 211 and then the light is led to the polarizing beam splitter 213 after passing through the converging lens 212. The polarizing beam splitter 213 divides an incident light flux into two components the polarization directions of which are orthogonal to each other and the divided components are detected by the two signal-detection optical sensors 216 and 217 constituted by a PIN photodiode. Signals output from the optical sensors 216 and 217 are current-voltage-converted by the I/V conversion amplifiers 218 and 219 and then, supplied to a reproducing signal processing section 228.

A disk controller 230 is constituted by a CPU (central processing unit), external interface, memory for realizing ECC (error checking and collection) and shock proof, and circuit for controlling the memory and modulating/demodulating recorded/reproduced data. Specifically, the controller 230 receives and executes a user-designated command in collaboration with the built-in CPU in accordance with an interface function with an external unit or realizes a recording/reproducing operation by executing a predetermined program. Thus, the disk controller 230 generalizes and controls the recording/reproducing apparatus 200 to take charge of the nucleus of each sequence control. Moreover, the controller 230 executes address recognition on a disk, data modulation/demodulation, and ECC (error checking and correction) in accordance with a reproducing signal obtained from the disk 201.

The timing control section 227 intermittently supplies the recording data encoded by the disk controller to the magnetic-head driver 203 at a predetermined timing. Moreover, the section 227 supplies various timing signals required by the reproducing signal processing section 228.

Furthermore, the section 227 includes a temperature sensor 206 in the apparatus and has a function of always observing the environmental temperature in the vicinity of the surface of a disk by the disk controller 230.

(Explanation of Structure of Disk 201 and Domain Wall Movement/Reproduction)

FIG. 4 is a sectional view showing a layer configuration of the disk 201 used in this embodiment. The disk 201 uses a case of a three-layer structure as an example of the media described in the official gazette of Japanese Patent Application Laid-Open No. 6-290496. Specifically, the disk 201 is constituted by sequentially stacking a dielectric layer 402 serving as an interference layer, first magnetic layer (moving layer) 403, second magnetic layer (switching layer) 404, third magnetic layer (memory layer) 405, and dielectric layer 406 serving as a protective layer on a transparent substrate 401. The first magnetic layer 403 is constituted of a magnetic layer having a relatively smaller domain wall coercive force than that of the third magnetic layer 405 near ambient temperature and having a large domain wall mobility and the second magnetic layer 404 is constituted of a magnetic layer having a Curie temperature lower than those of the first magnetic layer 403 and third magnetic layer 405. The third magnetic layer 405 is constituted of an ordinary magnetic recording layer superior in storage stability of magnetic domains.

As the transparent substrate 401, there is used, for example, polycarbonate, and an SiN layer is formed thereon in a thickness of 80 nm as the dielectric layer 402. Moreover, a GdFeCo layer is formed in a thickness of 30 nm as the first magnetic layer 403, a DyFeCo layer is formed in a thickness of 10 nm as the second magnetic layer 404, and a TbFeCo layer is formed in a thickness of 40 nm as the third magnetic layer 405 sequentially through sputtering.

Then, the operation principle of domain wall movement/reproduction is described below by referring to FIGS. 7-1 to 7-4. In this case, a case of a three-layer structure is described in which a memory layer for storing a recording-mark, a moving layer for directly contributing to detection of a reproducing signal by domain wall movement, and a switching layer for switching a connection state between the memory layer and the moving layer.

Figure 1:
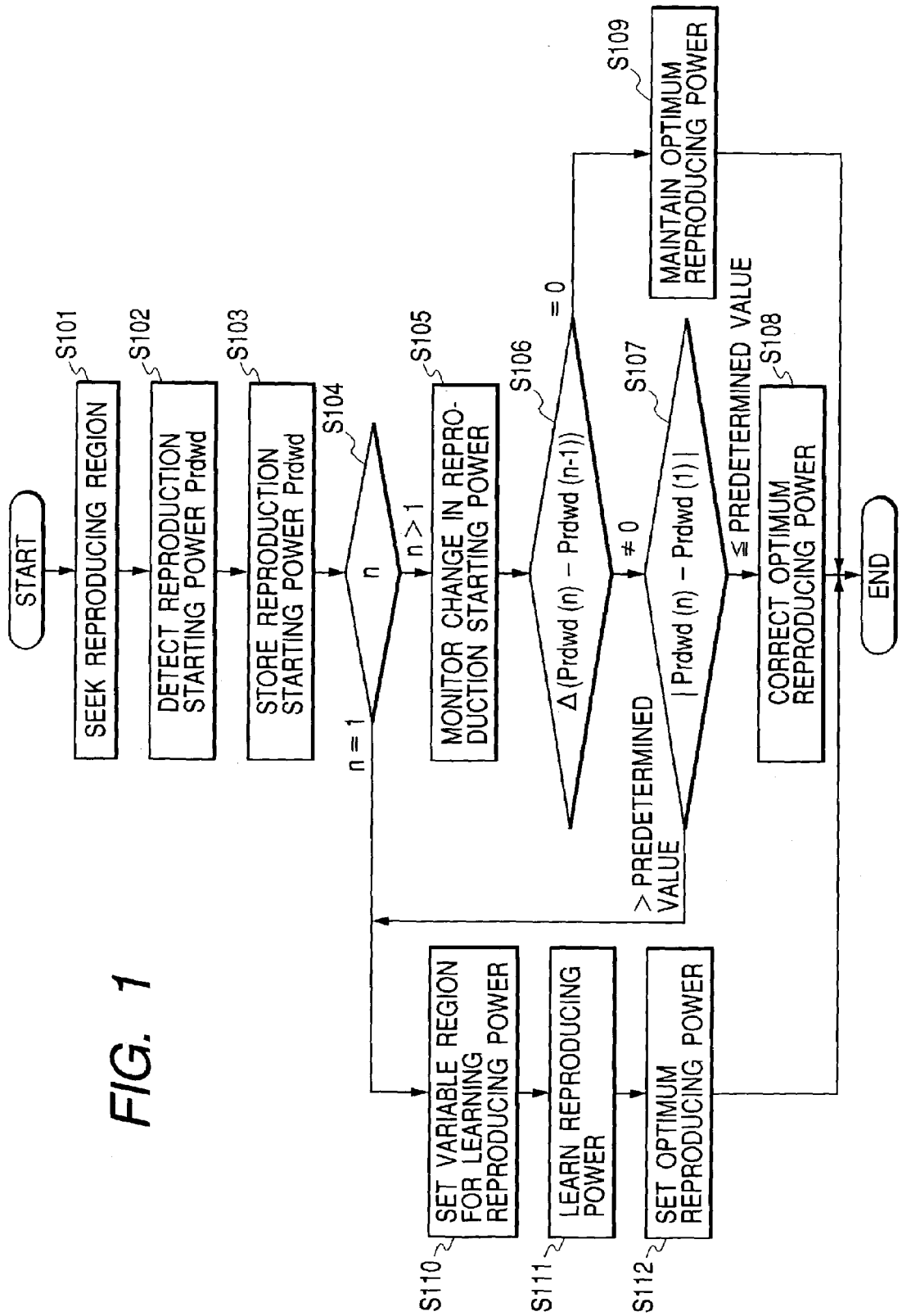
FIG. 1 is a flowchart showing operations of a first embodiment of the present invention.
Figure 3:
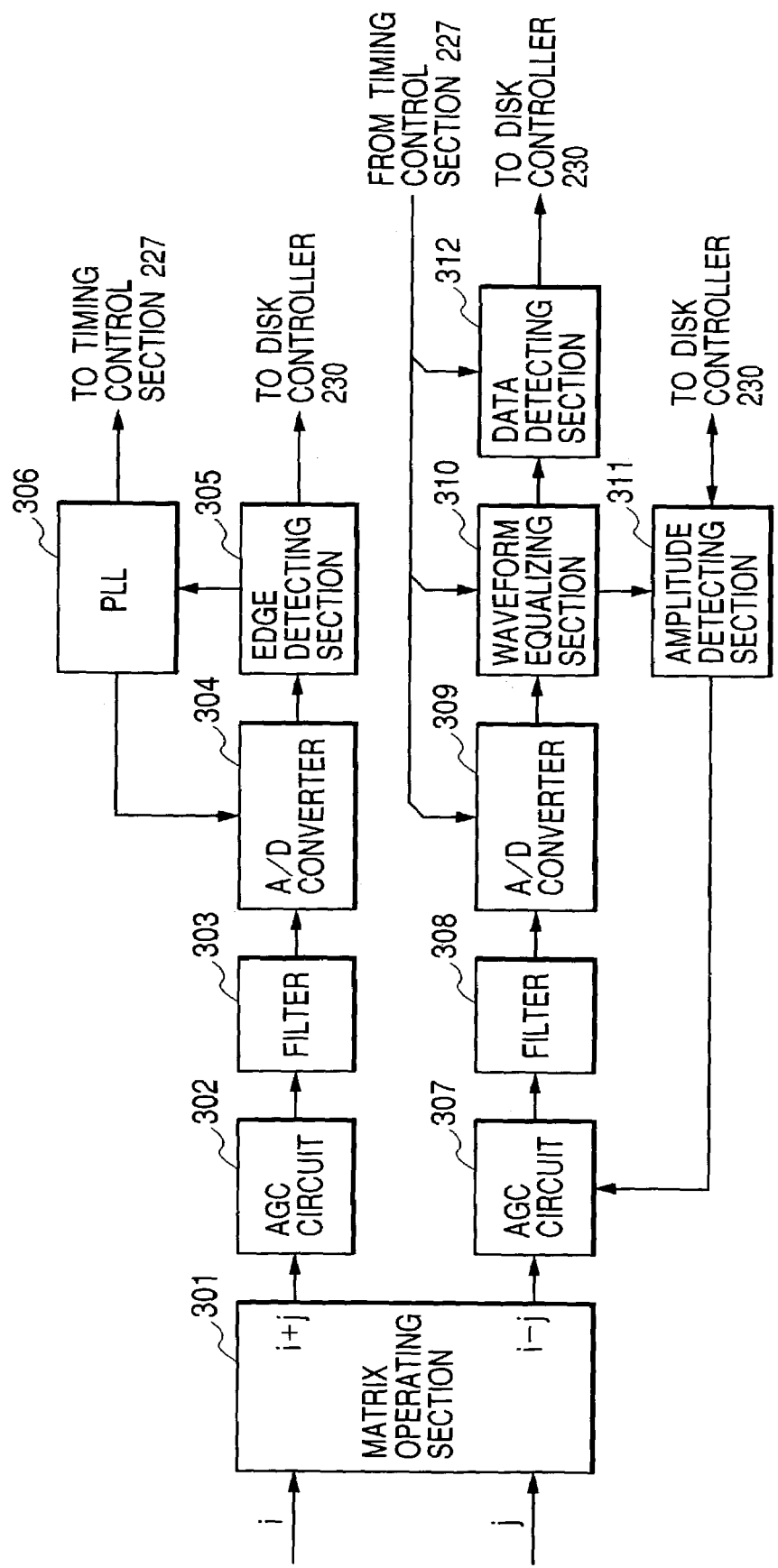
FIG. 3 is a functional block diagram of a reproducing signal processing section.

FIG. 7-1 is a view illustrating a magnetic domain pattern of a moving layer when viewed from above a track. The information tracks are magnetically separated from each other. FIG. 7-2 is a sectional view of a disk magnetic layer, showing states of a switching layer and a memory layer in the order from the above. The arrow in each layer shows the direction of atomic spin. The arrows in the layers denote the direction of atomic spin. An information signal constituted by "0" or "1" is expressed by the direction of spin. Moreover, a domain wall is formed at a boundary portion between regions the spin directions of which are opposite to each other. FIG. 7-3 is a waveform of a reproducing signal. FIG. 7-4 shows a temperature distribution formed in the magnetic layer heated by irradiation with a light beam. The temperature distribution shows a curve in which the temperature begins to rise from the front side of the traveling direction of a light beam spot and the peak of the temperature appears at the backside of the center of the light beam spot.

The light beam spot moves at a constant speed in the arrow direction as shown in FIG. 7-1. The isothermal line of the Curie temperature Ts of the switching layer is elliptically formed at a position distant from the center of the light beam spot. In this case, in the region outside the isothermal line Ts shown in FIG. 7-1, that is, the region in which the switching layer does not reach the Curie temperature, the domain wall of the moving layer is kept fixed to a corresponding domain wall position of the memory layer because the moving layer is exchangeably coupled with the memory layer having a large domain wall coercive force through the switching layer. However, when the temperature of the medium is raised due to irradiation with a light beam and almost reaches the isothermal line Ts, the switching layer reaches the Curie point and the exchangeable coupling between the moving layer and memory layer is broken. That is, the domain wall of the moving layer instantaneously moves to a region having a higher temperature and a lower domain wall energy density at the same time when the domain wall of the recording-mark reaches the Ts temperature region.

As a result, a magnetized region extending in a given length is formed in the moving layer independently of the magnetic domain interval of the memory layer, that is, the recording-mark length. The magnetic domain thus enlarged and formed in the moving layer is detected as a change in the amount of reflected light beam. Then, the obtained reproducing signal amplitude becomes an always-constant and maximum amplitude independently of the recording-mark length and shows a substantially rectangle waveform as shown in FIG. 7-3. According to the above-described principle, it is possible to obtain a very large reproducing signal amplitude for a recording-mark of less than an optical-system diffraction limit without depending on the diameter of a light beam spot or the numerical aperture NA of an objective lens.

(Detail of Configuration and a Series of Operations of Reproducing Signal Processing Section 228)

The track format of the disk 201 of this embodiment is briefly described below by referring to FIGS. 5-1 and 5-2. As shown in FIG. 5-1, one track is constituted by N segments. As shown in FIG. 5-2, each segment is constituted by a servo region, prewrite region, data region, and postwrite region. In this case, a wobble mark is formed in the servo region and a sample signal or address signal necessary for focusing or tracking control is provided by the wobble mark to realize the so-called sample servo system. Moreover, a magneto-optical signal provided with a predetermined modulation code is recorded in the data region.

Then, the configuration and a series of operations of a reproducing signal processing section 228 are described below in detail by referring to the accompanying drawings. FIG. 3 shows a functional-block configuration of the reproducing signal processing section 228.

In FIG. 3, the reproducing signal processing section 228 is provided with a matrix operating section 301, AGC (automatic gain control) circuits 302 and 307, filters 303 and 308, analog/digital converters (hereafter referred to as A/D converters) 304 and 309, edge detecting section 305, PLL (phase locked loop) 306, waveform equalizing section 310, amplitude detecting section 311, and data detecting section 312.

The light reflected from the disk 201 is provided with a Kerr rotation angle in accordance with the magnetic Kerr effect. That is, two polarized components are separated and detected in accordance with a recording magnetic-domain pattern and output as i signal and j signal through the I/V conversion amplifiers 218 and 219. The matrix operating section 301 obtains the sum and difference components of i signal and j signal. The section 301 detects a magneto-optical recording information (i−j) signal from the difference component. Moreover, a servo pit signal output corresponding to the amount of reflected light from the disk 201 is obtained from a (i+j) signal which is the sum component of i signal and j signal.

The servo pit signal (i+j) output from the matrix operating section 301 is gain-controlled so as to correspond to a fixed reflected light amount by the AGC circuit 302 in order to absorb dispersion in disk reflectances or difference in optical characteristics of individual disks, or a signal level difference due to a laser-power intensity change in each operation mode such as standby/reproducing/recording. After the above gain control, unnecessary high-frequency-band components of the servo pit signal (i+j) are suppressed by the prefilter 303 and the signal (i+j) is digitized by the A/D converter 304. Various edge informations on a pit portion of the disk (medium) are extracted from the digitized pit signal by the edge detecting section 305 and transmitted to the disk controller 230 at the subsequent stage. Moreover, a phase synchronized loop is constituted by the PLL 306 in accordance with the edge signal of the pit portion, and a clock synchronizing with a pit signal is generated and supplied to the A/D converter 304 and timing control section 227.

Unnecessary high-frequency-band components of a data (i−j) signal output from the matrix 301 are suppressed by the prefilter 308 after passing through the AGC circuit 307 and digitized by the A/D converter 309. The magnitude of the amplitude of the digitized data signal is detected by the amplitude detecting section 311. In this case, the AGC circuit 307 is feedback-controlled such that the data amplitude is kept at a fixed level. Then, the digital data are equalized to a predetermined value by the waveform equalizing section 310. Then, the data is detected by the data detecting section 312 in accordance with the maximum likelihood decoding and an obtained data signal is supplied to the disk controller 230 and undergoes error checking and correction (ECC) and demodulation. Clocks and various timing signals necessary for the A/D converter 309, wave equalizing section 310, and data detecting section 312 are supplied from the timing control section 227.

(Definition of DWDD Reproduction Starting Power)

The definition and measuring method of DWDD reproduction starting power (hereafter referred to as "Prdwd") which is an index relating to the reproducing power adjusting method of this embodiment are described below.

Figure 6:
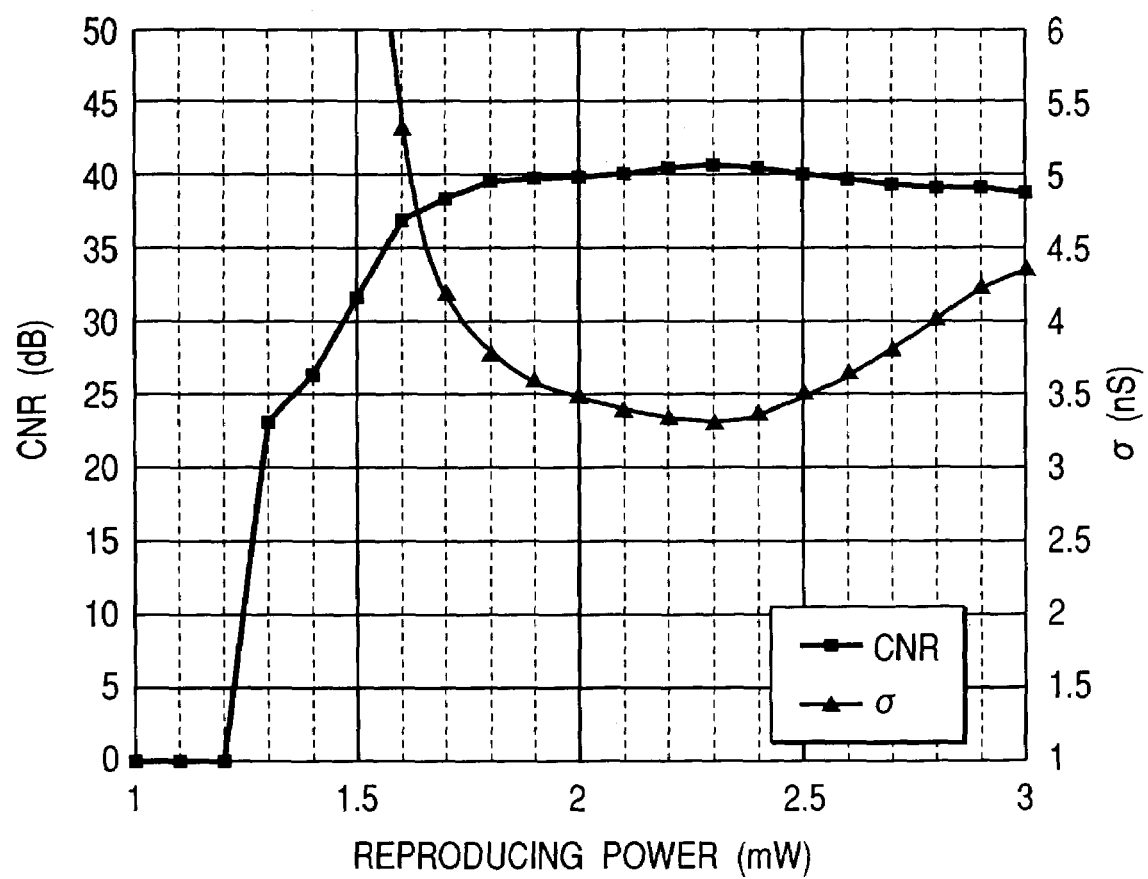
FIG. 6 is a graphical representation for illustrating a domain wall movement/reproduction starting power relating to the present invention.

FIG. 6 is a graphical representation obtained by plotting data (i−j) signal amplitude value: CNR (carrier Noise Ratio) (dB) and jitter: σ(ns) showing the quality of the signal when varying a reproducing power to a disk which records a single repetitive waveform as data. The measuring condition is obtained by reproducing a repetitive waveform having a linear velocity of 2.4 m/s and a mark length of 0.08 μm.

In FIG. 6, when raising the reproducing power from 1.0 mW by 0.1 mW at a time, first at the range between 1.0 and 1.2 mW, the moving layer remains exchangeably coupled with the memory layer because the temperature of the switching layer does not reach the Curie, and magnetic-domain enlargement due to movement of a domain wall does not occur, so that a reproducing waveform having a mark length of 0.08 μm cannot be obtained from this optical system.

Then, immediately after the reproducing power is changed from 1.2 mW to 1.3 mW, CNR rapidly rises by +24 dB from 0 dB (reproducing amplitude of 0). This exactly shows that a portion for the switching layer to reach the Curie temperature is produced by this reproducing power and enlargement of a magnetic domain by domain wall movement begins to occur. In this case, a region reaching the Curie temperature or more in the switching layer is not sufficiently large as compared to the beam size. Therefore, the region reaching the Curie temperature or more in the switching layer enlarges as the reproducing power rises, so that the reproducing signal amplitude increases. Then, the reproducing power reaches 40 dB which is an almost saturated level at about 1.6 to 1.7 mW. When the reproducing power increases, the region reaching the Curie temperature in the switching layer approaches a reproducing beam irradiated region, so that the reproducing signal amplitude shows a gentle change relative to the change of the reproducing power. Moreover, when the reproducing power is increased to 2.8 mW or more, the magnetic Kerr rotation angle is decreased due to the temperature rise of the medium and the reproducing signal amplitude begins to decrease as the reproducing power increases. On the other hand, the jitter σ showing the quality of a signal shows the most preferable value of 3.3 ns at the reproducing power of 2.3 mW.

As described above, it can be seen that when starting domain wall movement reproduction, a phenomenon of sudden increase in reproducing amplitude is observed and the power for starting the phenomenon is smaller by about 1 mW than 2.3 mW as the optimum reproducing power.

Here, the term "reproducing laser power" used herein is defined as a power when an increase of the reproducing amplitude of +6 dB or more is obtained by increasing the reproducing laser power by 0.1 mW. In the case of the example of FIG. 6, Prdwd is equal to 1.3 mW.

Figures 1, 16:
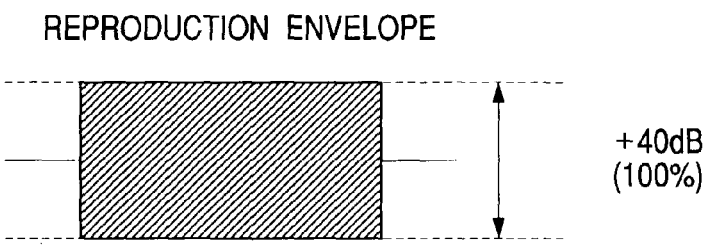
Figures 2, 16:
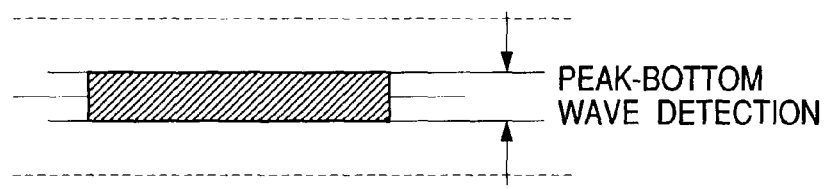

A specific example of reproducing signal amplitude detection by the amplitude detecting section 311 is described below by referring to FIGS. 16-1 and 16-2. FIG. 16-1 is a reproduction envelope waveform when holding an AGC circuit so that the maximum amplitude of a reproducing signal becomes 100%. FIG. 16-2 is a schematic view for detecting peak and bottom levels to a reproduction envelope and detecting a signal amplitude. The amount of change in reproduction-envelope detection levels is monitored by the disk controller 230 in accordance with a change in the reproducing power.

The manner of defining the DWDD reproduction starting power is not restricted to the above mentioned. For example, it is also allowed to define a DWDD reproduction starting power by assuming a level of 50% to the maximum amplitude 100% of a reproduction envelope as a threshold value and performing magnitude determination.

Figure 8:
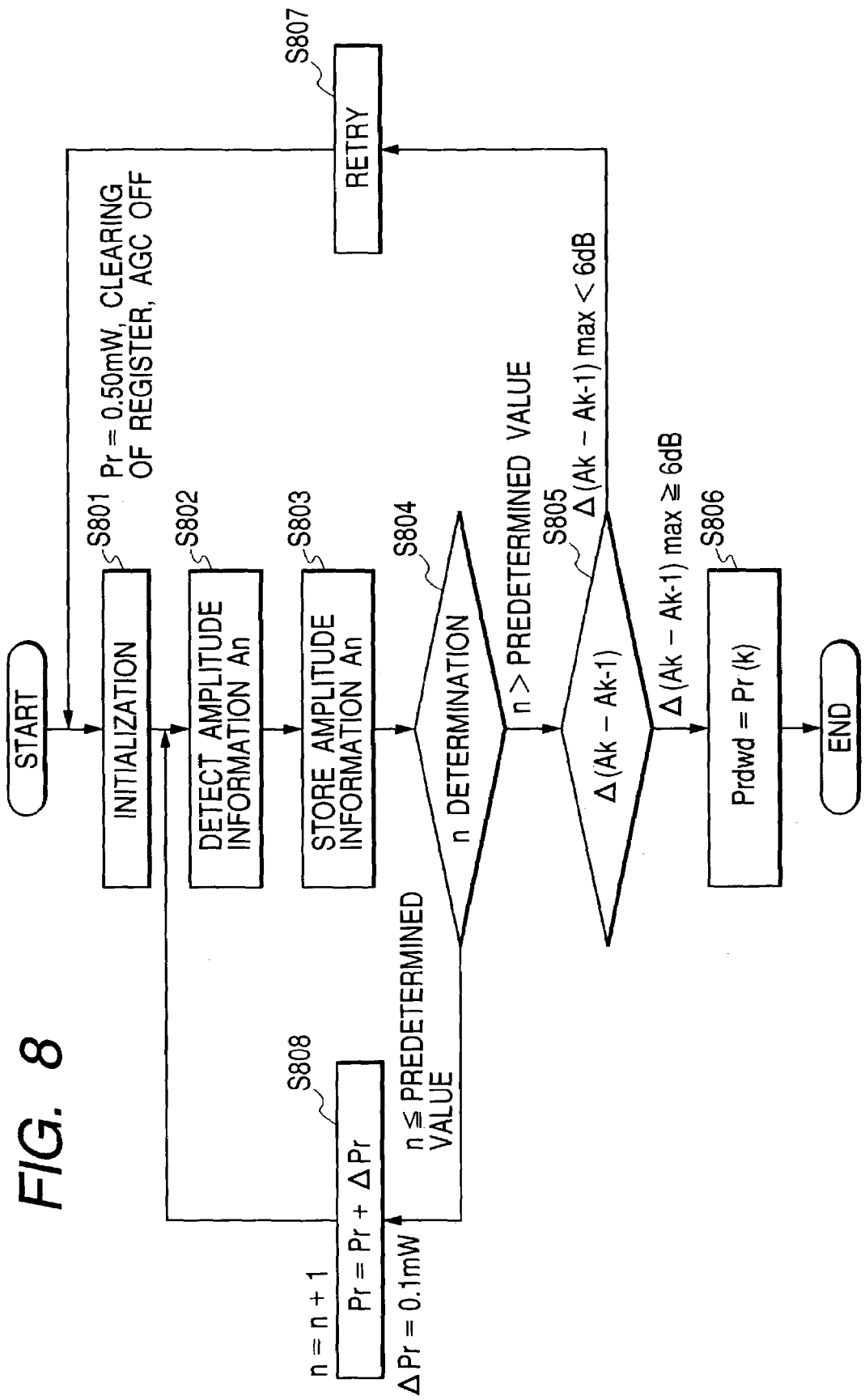
FIG. 8 is a flowchart showing operations for detecting a domain wall movement/reproduction starting power relating to the present invention.

Then, a specific technique for actually measuring a DWDD reproduction starting power is described below in detail by using the flowchart shown in FIG. 8.

[Step S801]

First, initialization for measuring a DWDD reproduction starting power is performed by the disk controller 230. Specifically, a measuring register value is cleared, the initial value of a testing reproducing power is set (Pr=0.5 mW), and the AGC circuit 307 of the reproducing signal processing section 228 is set to a predetermined gain to select a mode free from AGC control. Thereafter, step S802 is started.

[Steps S802 and S803]

The reproducing laser power for detecting and storing an amplitude information $A_n$ is set to the initial value (Pr=0.5 mW) set in step S801 to reproduce the reproduction indicated data. Reproduced data are envelope-detected by the amplitude detecting section 311 of the reproducing signal processing section 228 (step S802) and the obtained amplitude value is stored in a register $A_1$ (step S803). Thereafter, step S804 is started.

[Steps S804 and S808]

The amplitude information $A_n$ is repeatedly measured up to a predetermined power to determine whether n exceeds a predetermined number in step S804 by assuming the number of measurements n as a trial frequency (or number of times of trials). When n is equal to or less than a predetermined number, the reproducing power is increased by ΔPr (e.g., 0.1 mW) in step S808 to execute steps S802 and S803. Because the trial frequency is determined in step S804, amplitude informations $A_1$, $A_2$, $A_3$, . . . , An are measured while increasing the reproducing power by ΔPr (0.1 mW) at a time up to the predetermined frequency n to store the informations in the register. When the predetermined frequency of trials are completed, step S805 is started.

[Step S805]

In step S805, the maximum value $\Delta(A_k-A_{k-1})_{max}$ of $\Delta(A_k-A_{k-1})(1 \leq k \leq n)$ is obtained from the amplitude informations stored in the register. Then, the value of k satisfying $\Delta(A_k-A_{k-1}) \geq 6$ dB is output. When $\Delta(A_k-A_{k-1})_{max}$ is less than 6 dB, step S807 is started to lower the initial value of the reproducing power to attempt retry (re-execution of the steps beginning with step S801).

[Step S806]

When $\Delta(A_k-A_{k-1})_{max}$ is equal to or more than 6 dB in step S805, a reproduction providing power value Pr(k) according to the value of k which maximizes an amplitude difference $\Delta(A_k-A_{k-1})$ and satisfies the relationship of $\Delta(A_k-A_{k-1}) \geq 6$ dB is defined as the DWDD reproduction starting power (Prdwd).

$$Prdwd = Pr(k)$$

(Meaning and a Series of Operations of Reproducing Power Leaning)

The meaning of the term "reproducing power learning" used herein and an operation flow of the reproducing power learning are described below by referring to the accompanying drawings.

The term "reproducing power learning" means detection of a reproducing power by which the quality of a reproducing signal becomes best. As described above, in the relationship shown in FIG. 6, it is shown that when an output of the filter 308 for a reproducing signal is observed, the jitter σ which is a time-base varying component is defined as an evaluation standard, and a reproducing power of Pr=2.3 mW is used, the quality of signal becomes best. Thus, the normal "reproducing power learning" is an operation for obtaining an optimum reproducing power Pr by trials on the basis of a certain evaluation standard while stepwise varying a reproducing power from a low power up to a high power.

Figure 10:
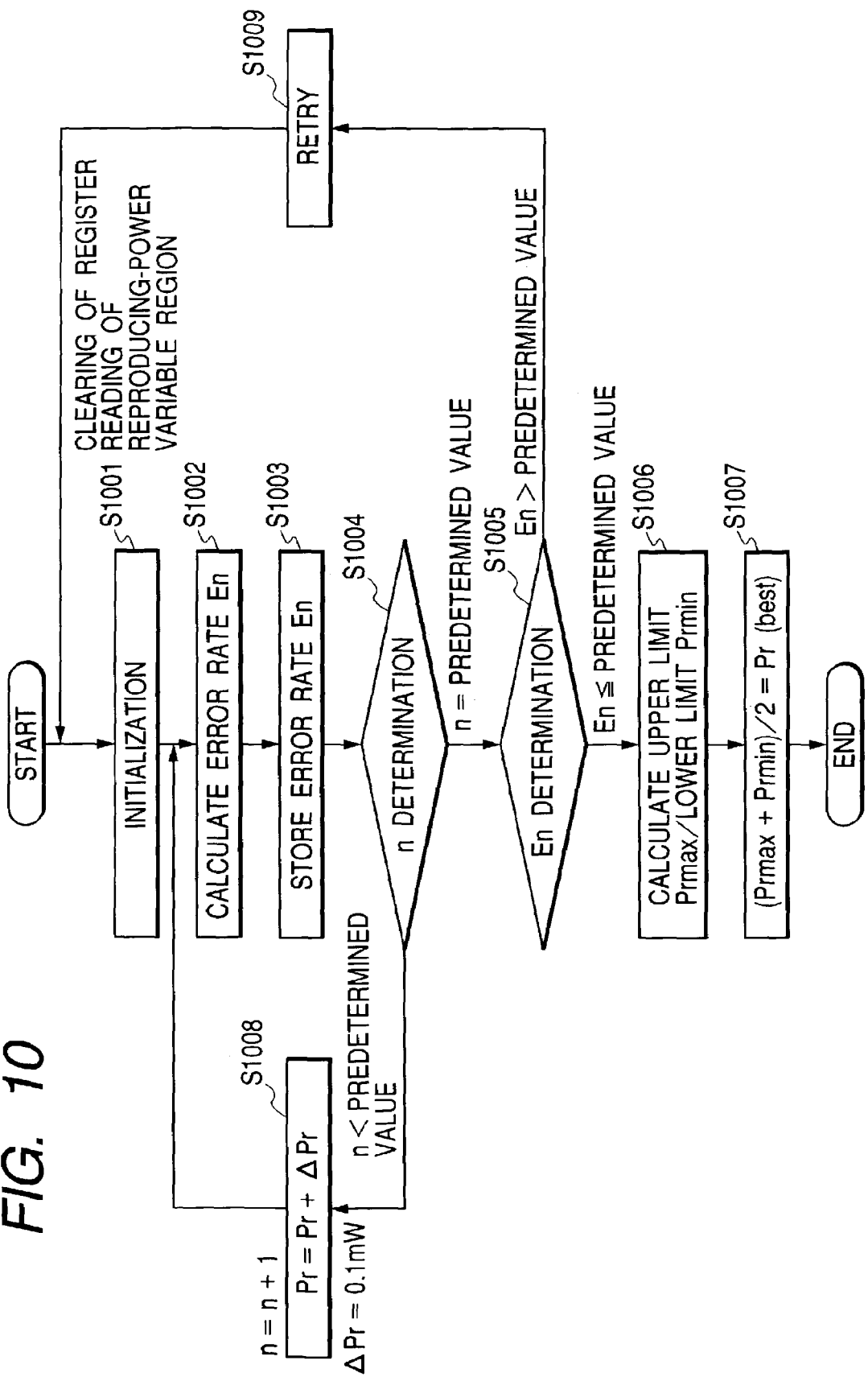
FIG. 10 is a flowchart showing operations for leaning a reproducing power.

FIG. 10 is an operational flowchart of reproducing power learning. Specific operations of the reproducing power learning are described below by referring to FIG. 10.

[Step S1001]

First, initialization necessary for reproducing power learning is carried out by the disk controller 230.

Specifically, a measuring register value is cleared and a variable region of a testing reproducing power (start point and end point) is set. Then, step S1002 is started.

[Steps S1002 and S1003]

In step S1002, the reproducing power is set to a start point to reproduce a designated reproducing region. The number of errors in obtained data is detected by an ECC (error checking and correction) section of the disk controller 230 and an error rate $E_1$ is calculated. Thereafter, in step S1003, the error rate is stored in the register. Then, step S1004 is started.

[Steps S1004 and S1008]

It is determined in step S1004 whether n reaches a predetermined value by assuming the number of calculation n of the error rate of the reproducing power variable region as a trial frequency. When n is less than a predetermined number, in step S1008 the reproducing power is increased by $\Delta Pr$ (e.g., 0.1 mW) to execute steps S1002 and S1003. As a result, the error rate at each reproducing power when increased in a step of $\Delta Pr$ (0.1 mW) until n reaches the predetermined value is sequentially calculated as $E_1$, $E_2$, $E_3$, ..., $E_N$ and stored in the register. When trials of the predetermined value are completed, step S1005 is started.

[Step S1005]

Figure 9:
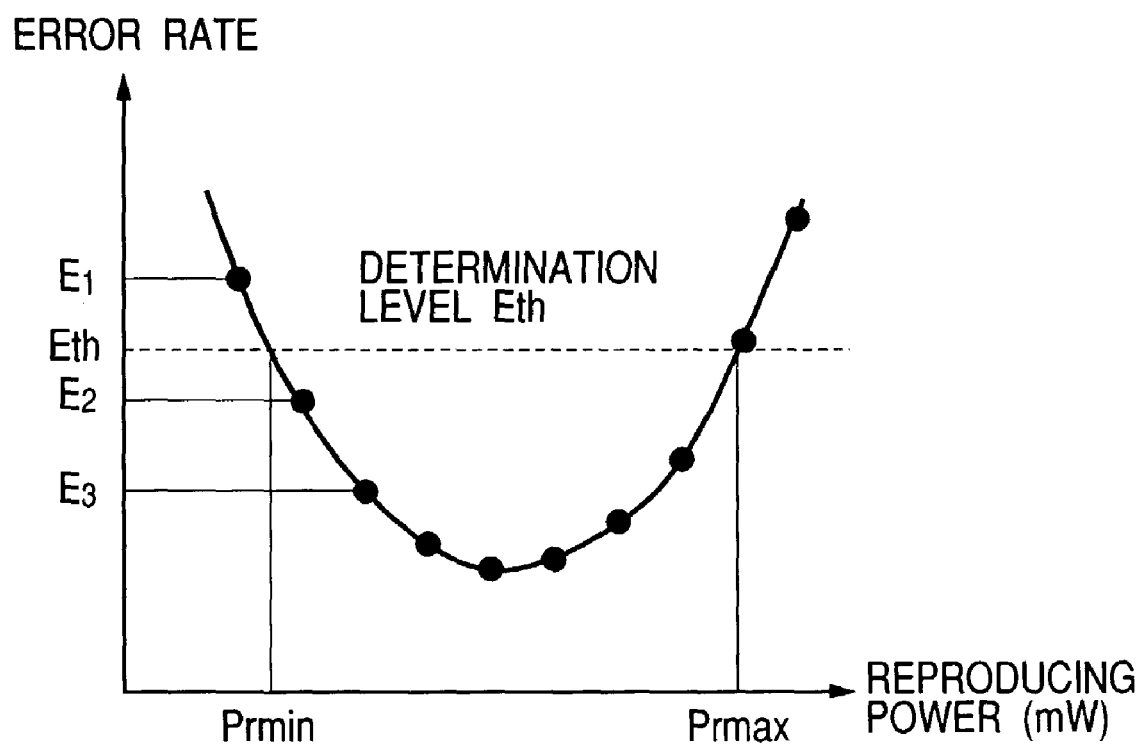
FIG. 9 is a graphical representation for explaining learning of a reproducing power.

In step S1005, the reliability of each the error rates E1, E2, E3, ..., $E_N$ stored in the register is determined. FIG. 9 is a graph obtained by plotting the error rate stored in each register and the reproducing power at the time of measurement. It can be seen that the error rate is increased at the low reproducing power side and high reproducing power side. A determination level $E_{th}$ is set in FIG. 9. In this case, the determination level $E^{th}$ shows the line of error rate=$5.0\times10^{-4}$. When all of the obtained error rates $E_1$, $E_2$, $E_3$, ... $E_N$ are more than the determination level Eth in step S1005, step S1009 is started and operations are retried (operations are executed again from step S1001). Otherwise, step S1006 is started.

[Step S1006]

In step S1006, intersections between the curve of the error rates $E_1$, $E_2$, $E_3$, ... $E_N$ and the determination level $E_{th}$ are obtained. These intersections are defined as Prmin (mW) at the smaller power side and as Prmax (mW) at the greater power side. Since the step width of reproducing power is actually a relatively rough sample value, a reproducing power corresponding to an error rate of $5.0\times10^{-4}$ is linearly interpolated. Thus, in step S1006, two intersections Prmin and Prmax between the determination level $E_{th}$ and the error-rate curve are calculated.

[Step S1007]

An optimum reproducing power Pr is calculated from Prmin and Prmax calculated in step S1006 in accordance with the following equation.

$$Pr=(Pr\text{max}+Pr\text{min})/2$$

This means that a central value between upper limit and lower limit of a reproducing power corresponding to the error rate of $5.0\times10^{-4}$ is set to the optimum reproducing power Pr, as shown in FIG. 9.

(First Embodiment)

(Control Flow of Optimum Reproducing Power by First Embodiment)

The present invention optimizes the reproducing power by monitoring a change in the DWDD reproduction starting power (Prdwd) described above. FIG. 1 is a flowchart showing the whole operation of the optimum-reproducing-power adjusting method according to this embodiment. A control flow is described below by referring to FIG. 1.

[Step S101: Seek to Reproducing Region]

First, when receiving a reproduction command from an external unit through an interface, the disk controller 230 makes the optical head 240 to seek a region designated for reproduction on the disk 201 to set a reproduction standby state.

[Steps S102 and S103: Detection and Storage of DWDD Reproduction Starting Power]

After seeking in step S101, the reproducing signal processing section 228 is controlled by the disk controller 230 to measure the DWDD reproduction starting power (Prdwd) in the region designated for reproduction (step S102). The obtained DWDD reproduction starting power is stored in the register (step S103). Then, step S104 is started.

[Step S104: First-time Determination]

It is determined in step S104 whether the detection of the DWDD reproduction starting power Prdwd (n) is for the first time, that is, whether n is equal to 1 by assuming k as the detection frequency of the reproduction starting power. When the detection is for the first time {Prdwd(1)}, step S110 is started to learn an optimum reproducing power. When the detection of the DWDD reproduction starting power is for the second or more time {Prdwd(n):n>1}, step S105 is started.

[Step S110: Setting of Power Variable Region When Learning Reproducing Power]

Figure 11:
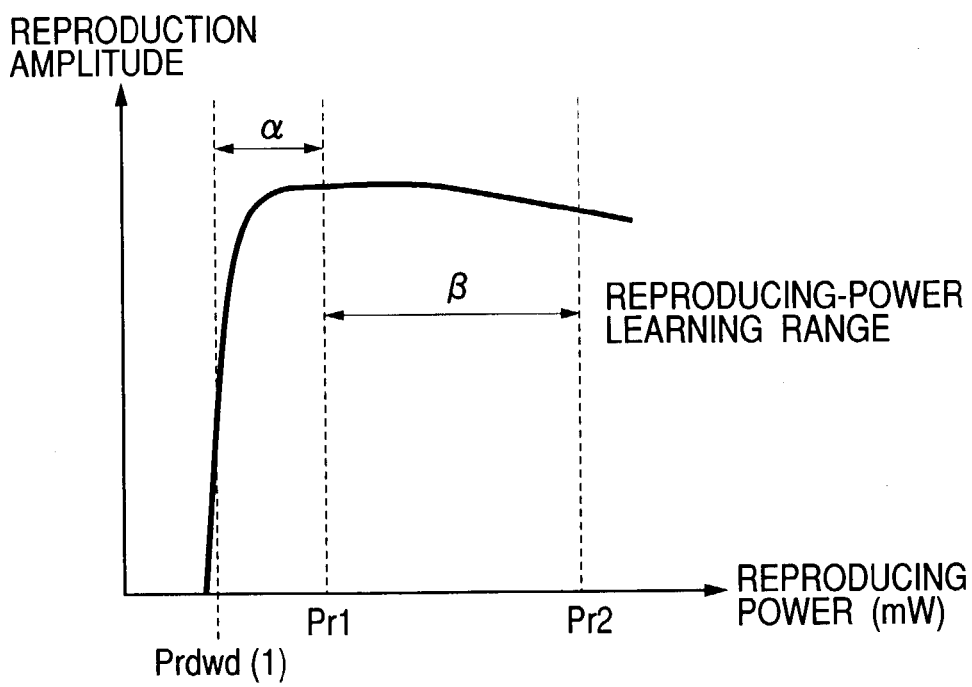
FIG. 11 is a graphical representation for explaining a reproducing power-learning variable region relating to the present invention.

When the DWDD reproduction starting power is detected for the first time, a power variable region for trial of reproducing power learning is set in accordance with the DWDD reproduction starting power Prdwd(1). FIG. 11 shows a relation between the reproducing power and reproducing signal amplitude value. By performing trial reproductions while varying the reproducing power from a small power to a high power in a plurality of steps for the data designated for reproduction to set a reproducing power by which the quality of the reproducing signal becomes best, as an optimum reproducing power. When the reproducing power is too small, domain wall movement/reproduction does not occur. When the reproducing power is too great, the reproducing signal quality is deteriorated because the magnetic Kerr rotation angle decreases. Therefore, Pr1 and Pr2 are defined as follows based on the result of the DWDD reproduction starting power Prdwd(1).

$$Pr1=Prdwd(1)+\alpha(\text{mW})$$

$$Pr2=Pr1+\beta(\text{mW})$$

wherein $\alpha$ and $\beta$ are constants.

In the variable region from Pr1 to Pr2 set as described above, trial reproducing power learning is performed. Then, in the power variable region, an adjustment region is changed following a change of the DWDD reproduction starting power. Then, step S111 is started.

[Steps S111 and S112: Learning of Reproducing Power and Setting of Optimum Reproducing Power]

In step S111, reproducing power learning is performed on the basis of the power variable region obtained in step S110. Then, in step S112, the optimum reproducing power Pr obtained through reproducing power learning in step S111 is set to a reproducing power to complete the processing.

[Steps S105 and S106: Monitoring of Change of DWDD Reproduction Starting Power]

When the DWDD reproduction starting power is detected for a second or more time in step S104, the change of the DWDD reproduction starting power is monitored in step S105. Specifically, the difference component $\Delta Prdwd(n)$ between the value $Prdwd(n)$ calculated at present time and the value $Prdwd(n-1)$ calculated at the last time is calculated.

$$\Delta Prdwd(n)=Prdwd(n)-Prdwd(n-1)$$

Then, in step S106, it is determined whether $\Delta Prdwd(n)$ is 0 or not. When $\Delta Prdwd(n)$ is 0, that is, the DWDD reproduction starting power is not changed, step S109 is started to complete the processing without changing the optimum reproducing power. However, when $\Delta Prdwd(n)$ is not 0, step S107 is started.

[Step S107: Determination of Total Change Value of Prdwd]

In step S107, the difference $|Prdwd(n)-Prdwd(1)|$ between the DWDD reproduction starting power $Prdwd(n)$ calculated at present time in step S106 and the DWDD reproduction starting power $Prdwd(1)$ calculated at the first time is calculated. Then, when there is a variation satisfying $|Prdwd(n)-Prdwd(1)|>\gamma$ ($\gamma$ is a constant), step S110 is started to re-execute reproducing power learning as described below. However, when $|Prdwd(n)-Prdwd(1)|$ is equal to or less than $\gamma$, step S108 is started to correct the optimum reproducing power.

[Step S108: Correction of Optimum Reproducing Power]

In step S108, an actual reproducing power is corrected depending on the amount of change in the DWDD reproduction starting power without performing power learning.

Figure 12:
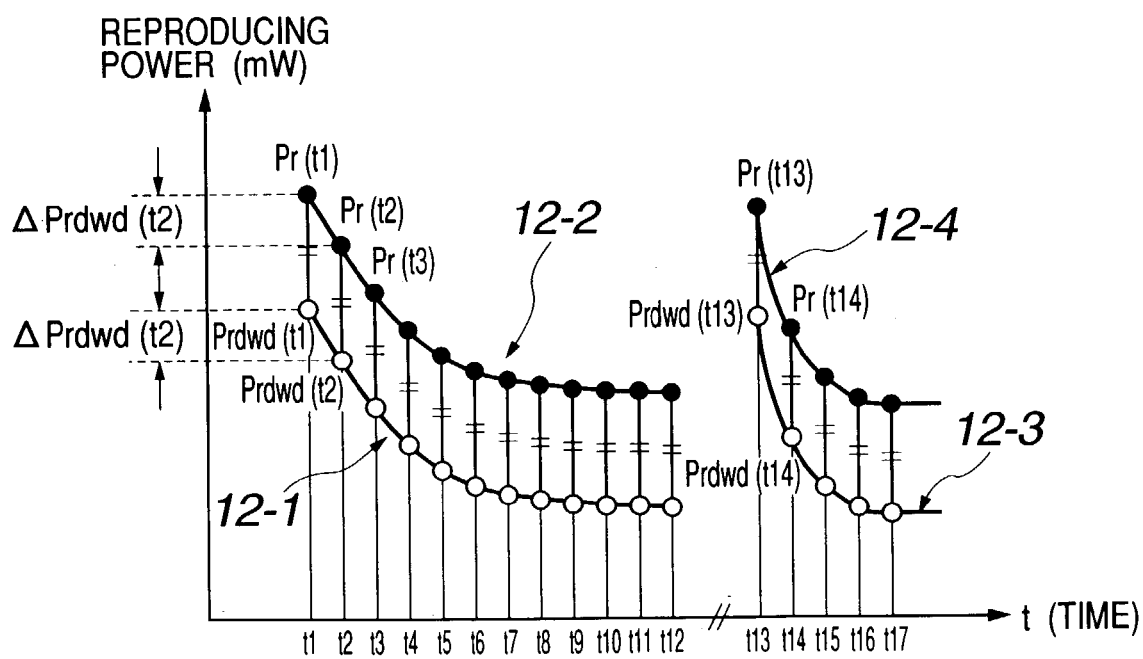
FIG. 12 is a graphical representation for explaining automatic calibration of a reproducing power relating to the present invention.

FIG. 12 shows states of transition with the elapse of time in correction of the reproducing power. In FIG. 12, the axis of abscissa denotes time and the axis of ordinate denotes reproducing power. It is assumed that the recording/reproducing apparatus of this embodiment is started at a certain time (before t1), the DWDD reproduction starting power is monitored at times t1, t2, t3, . . . , and simultaneously an optimum reproducing power is set. 12-1 shows a time transition of the DWDD reproduction starting power (plotted with white circles). Moreover, 12-2 shows a time transition of an optimum reproducing power set value (plotted with black circles).

In this case, on the basis of the DWDD reproduction starting power $Prdwd(t1)$ detected at the time t1, an optimum reproducing power $Pr(t1)$ obtained through power learning is set. Then, a DWDD reproduction starting power $Prdwd(t2)$ is detected at the time t2. The DWDD reproduction starting power is decreased by $\Delta Prdwd(t2)=|Prdwd(t2)-Prdwd(t1)|$ between the time t1 and the time t2. This is because the temperature in the apparatus rises after actuation of the apparatus and the region of the isothermal line Ts formed on the switching layer on the disk 201 becomes able to be achieved by a lower reproducing power.

Therefore, at the time t2, the optimum reproducing power $Pr(t1)$ is corrected by $\Delta Prdwd(t2)$ which is an amount of change of the DWDD reproducing power.

$$Pr(t2)=Pr(t1)+\Delta Prdwd(t2)$$

Subsequently similarly, the optimum reproducing power is corrected corresponding to the amount of change in the DWDD reproduction starting power.

$$Pr(t3)=Pr(t2)+\Delta Prdwd(t3)$$

$$Pr(tk)=Pr(tk-1)+\Delta Prdwd(tk)(1\leq k\leq n)$$

As shown in FIG. 12, the set value of an actual optimum reproducing power is also corrected proportionally to the change of the DWDD reproducing power. A tendency is observed that the temperature rise of the inside of the apparatus is saturated approximately at the time t5 and the variation of the DWDD reproducing power is converged. It is also possible to optimize the reproducing power set value following the above dynamic variation.

In step S108 of this embodiment, the optimum reproducing power is corrected at a ratio of one to one on the change of the detected DWDD reproduction starting power. However, the present invention is not restricted thereto, and it is a matter of course that an optimum reproducing power can be corrected by using a predetermined coefficient and setting $Pr(k)=p\times Pr(k-1)+q\times\Delta Prdwd(k)$ (p, q: constants).

12-3 and 12-4 are curves obtained by schematically plotting a state of newly setting a disk of a temperature corresponding to an outside air temperature to a magneto-optical disk drive having an inside temperature raised up to a fixed temperature and making the drive perform a reproducing operation. 12-3 shows a time transition of the DWDD reproduction starting power Prdwd (plotted with white circles). 12-4 shows a time transition of a set value of an optimum reproducing power (plotted with black circles).

After replacing the disks, on the basis of the DWDD reproduction starting power $Prdwd(t13)$ detected at the time t13, the optimum reproducing power $Pr(13)$ obtained through power learning is set. Then, a DWDD reproduction starting power (t14) is detected at the time t14. The DWDD reproduction starting power is decreased by $\Delta Prdwd(t14)=|Prdwd(t14)-Prdwd(t13)|$ between the time t13 and the time t14. This is because the temperature of the disk magnetic film rapidly rose due to the high-temperature environment in the apparatus from the temperature corresponding to the outside-air temperature immediately after replacement of the disks and the region of the isothermal line Ts formed on the switching layer on the disk became able to be reached at a lower reproducing power. Therefore, the optimum reproducing power $Pr(t13)$ is corrected by $\Delta Prdwd(t14)$ which is the amount of change in the DWDD reproduction starting power.

$$Pr(t14)=Pr(t13)+\Delta Prdwd(t14)$$

Subsequently similarly, it is possible to correct the optimum reproducing power depending on the amount of change in the DWDD reproduction starting power.

As described above, the optimum reproducing power in step S108 is corrected. After the optimum reproducing power is corrected, the processing is completed.

(Re-execution of Reproducing Power Learning)

Figure 15:
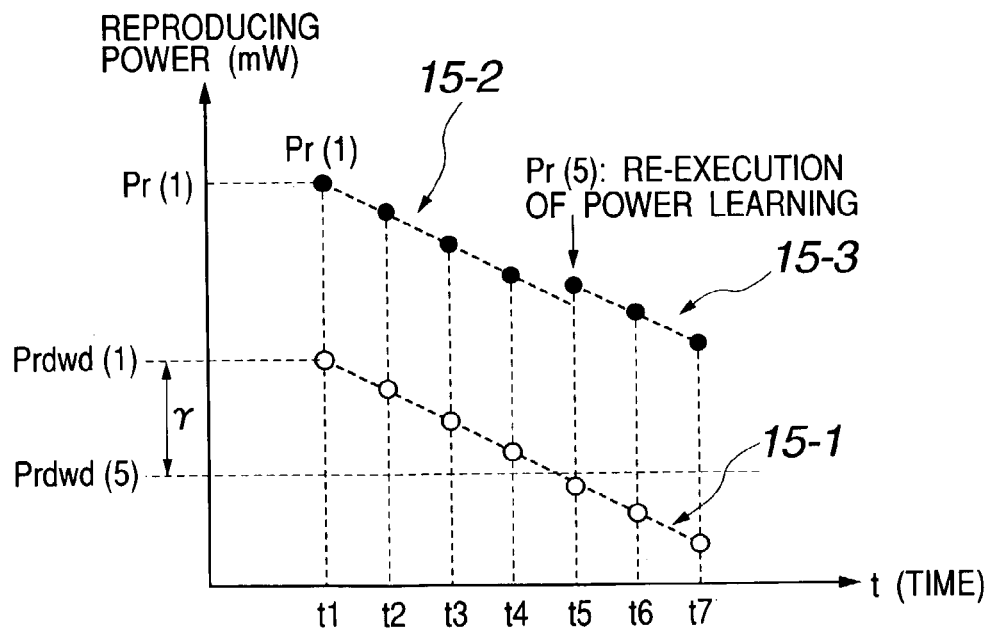
FIG. 15 is a graphical representation for explaining reexecution of reproducing power learning relating to the present invention.

Hereafter, the re-execution of reproducing power learning performed when $|Prdwd(n)-Prdwd(1)|$ is more than $\gamma$ in step S107 is described below by referring to FIG. 15.

When a considerable temperature change, time elapse, or positional change in a disk occurs after setting the optimum reproducing power initial value Pr(1), a correction error may occur if only calibration according to the amount of change in the DWDD reproduction starting power is performed. 15-1 is an illustration obtained by plotting detection results of the DWDD reproduction starting power on the time base. As described in connection with correction of the optimum reproducing power in step S108, the optimum reproducing power Pr is corrected by monitoring a change in the DWDD reproducing power. 15-2 shows a curve for correcting the optimum reproducing power Pr based on a change of Prdwd. At present, Prdwd(5) changes by γ (mW) or more compared to Prdwd(1) at the time t5. Therefore, reproducing power learning is re-executed in accordance with the determination according to step S107 and the optimum reproducing power Pr(5) is obtained and reset. Thereafter, as shown in 15-3, a reproducing power is calibrated by monitoring a change of Prdwd. After executing the power learning at the time t5, the total amount of change in Prdwd is determined on the basis of Prdwd(5).

(Application to MSR Medium)

Although the embodiment according to a DWDD medium has been described so far in detail, the present invention can also be applied to a magnetically induced resolution (hereafter referred to as MSR) medium.

Figures 1, 17:
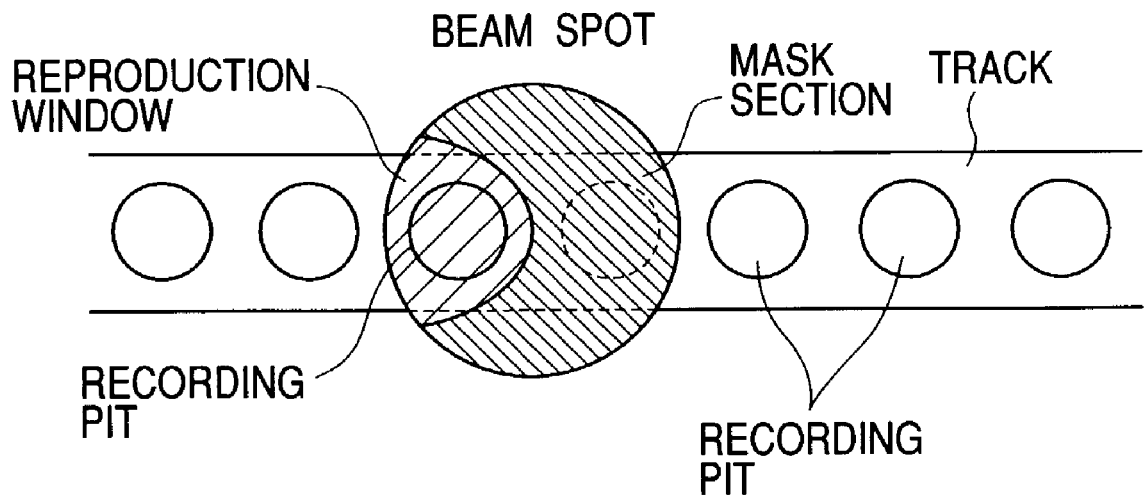
Figures 2, 17:
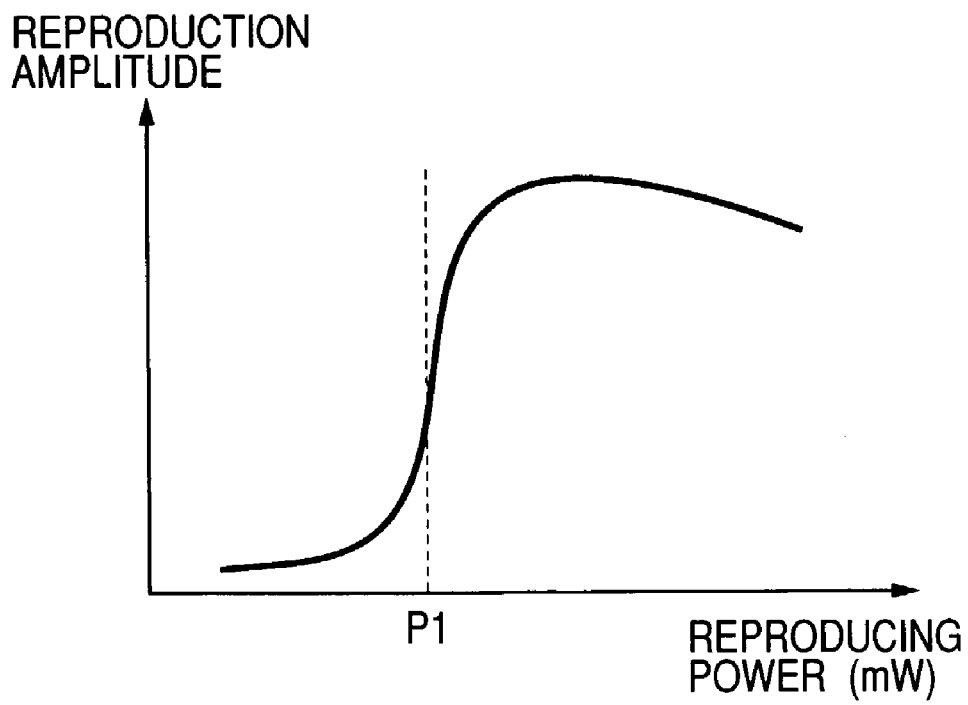

The MSR medium conforms to a system of using a recording medium having a plurality of magnetic layers with magnetic characteristics that vary depending on a temperature stacked on each other so that an information on a minute mark of less than an optical resolution can be detected. FIG. 17-1 is an illustration for explaining a reproduction principle using an MRS medium. In FIG. 17-1, a heated isothermal region is formed on a medium by a beam spot irradiated on reproduction and initial magnetization information is erased, and a reproduction window through which the magnetization information on a recording layer is transferred and a mask portion on which the initial magnetization information is left are formed. The magnetization information to be transferred to a reproducing layer is data-detected in accordance with a magneto-optical effect. Because a recording pit is transferred and detected at the reproduction window but is not transferred at the mask portion, it is possible to reproduce a pit smaller than the beam diameter.

FIG. 17-2 shows a relation between a reproducing power and a reproducing amplitude value in the MSR medium. There is shown a characteristic that when increasing a reproducing power from a low power, a reproduction window is formed approximately at a power P1 (mW) and a reproducing amplitude rapidly increases.

Thus, also in the case of the MSR medium, the MSR optimum reproducing power is previously learned, a power for starting an MSR operation is obtained, and a relational value between MSR optimum reproducing power and MSR operation starting power is calculated and held. Then, by monitoring the MSR reproduction starting power at a predetermined cycle and correcting a change thereof with the thus held relational value, it is possible to set an optimum reproducing power.

(Second Embodiment)

(Control Flow of Optimum Reproducing Power by Second Embodiment)

Figure 18:
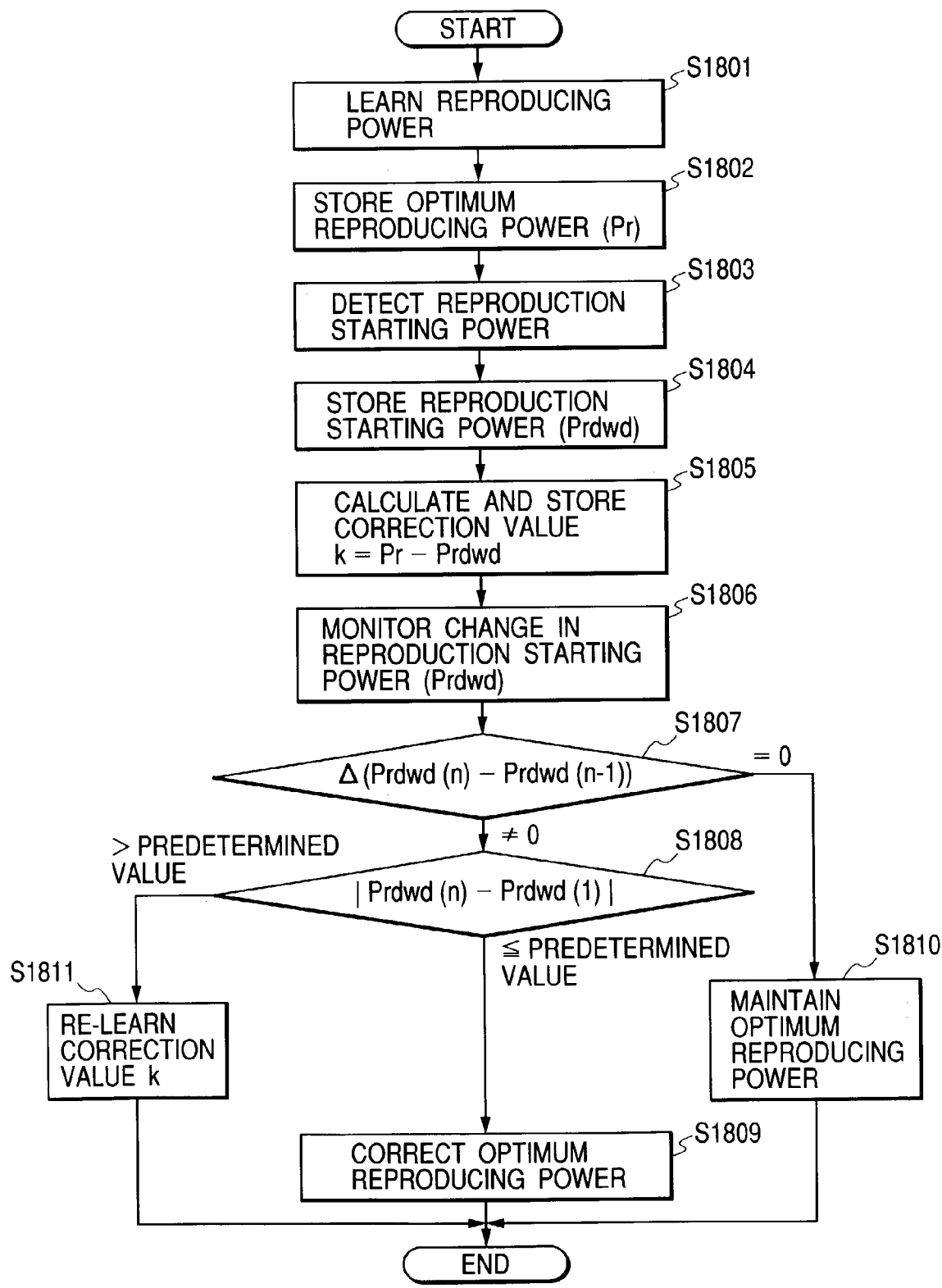
FIG. 18 is a flowchart showing operations of a second embodiment of the present invention.

In this embodiment, the ratio k between the optimum reproducing power (Pr) and DWDD reproduction starting power (Prdwd) is obtained in a predetermined test region and stored in a register, and the reproducing power is optimized depending on a change in the DWDD reproduction starting power (Prdwd). FIG. 18 is a flowchart showing the whole operation of an optimum-reproducing power adjusting method according to this embodiment and a control flow is described below in detail by referring to FIG. 18.

[Steps S1801 and S1802: Learning and Storage of Optimum Reproducing Power]

A disk controller 230 makes an optical head 240 seek a predetermined test region on a disk 201 and learns an optimum reproducing power (Pr) (step S1801). The obtained optimum reproducing power is stored in the register (step S1802).

[Steps S1803 and S1804: Detection and Storage of DWDD Reproduction Starting Power]

Then, the DWDD reproduction starting power (Prdwd) in a region designated for reproduction is measured under the control of the disk controller 230 (step S1803). The obtained DWDD reproduction starting power is stored in the register (step S1804).

[Step S1805: Calculation and Storage of Correction Value k]

The ratio between the optimum reproducing power (Pr) and DWDD reproduction starting power (Prdwd) stored in the register is calculated. In the case of this embodiment, k=(Pr)−(Prdwd) is obtained and stored in the register.

[Steps S1806 and S1807: Monitoring in Change of DWDD Reproduction Starting Power]

In step S1806, a change in the DWDD reproduction starting power is monitored. Specifically, the difference component ΔPrdwd(n) between the value Prdwd(n) calculated at present time and the value Prdwd(n−1) calculated at the last time is calculated.

$$\Delta Prdwd(n)=Prdwd(n)-Prdwd(n-1)$$

Then, in step S1807, it is determined whether ΔPrdwd(n) is equal to 0 or not. When ΔPrdwd(n) is equal to 0, that is, the DWDD reproduction starting power is not changed, step S1810 is started to maintain the optimum reproducing power and complete the processing. On the other hand, when ΔPrdwd(n) is not equal to 0, step S1808 is started.

[Step S1808: Determination of Total Change Value of Prdwd]

In step S1808, the difference |Prdwd(n)−Prdwd(1)| between the DWDD reproduction starting power Prdwd(n) calculated at present time and the DWDD reproduction starting power Prdwd(1) calculated at the first time is calculated. Then, when there is a variation satisfying the relation |Prdwd(n)−Prdwd(1)|>δ (δ is a constant), step s1811 is started to learn the correction value k again. However, when |Prdwd(n)−Prdwd(1)| is equal to or less than δ, step S1809 is started to correct the optimum reproducing power.

[Step S1809: Correction of Optimum Reproducing Power]

In step S1809, the correction value k previously stored in the register is added to the DWDD reproduction starting power Prdwd(n). That is, the optimum reproducing power Pr(n) is calculated by correcting Pr(n) such that Pr(n) is equal to Prdwd(n)+k to correct an actual reproducing power without executing a power learning step.

Incidentally, in step S1805, the difference between (Pr) and (Prdwd) is used as the correction value k, but the correction value k is not restricted to the difference and it is also possible to use the ratio between (Pr) and (Prdwd). Moreover, the relearning of a correction value in step S1811 or the like is not restricted to a predetermined test region, and the correction value can be calculated by detecting an optimum reproducing power and DWDD reproduction starting power also in a user data region.

(Third Embodiment)

Figure 13:
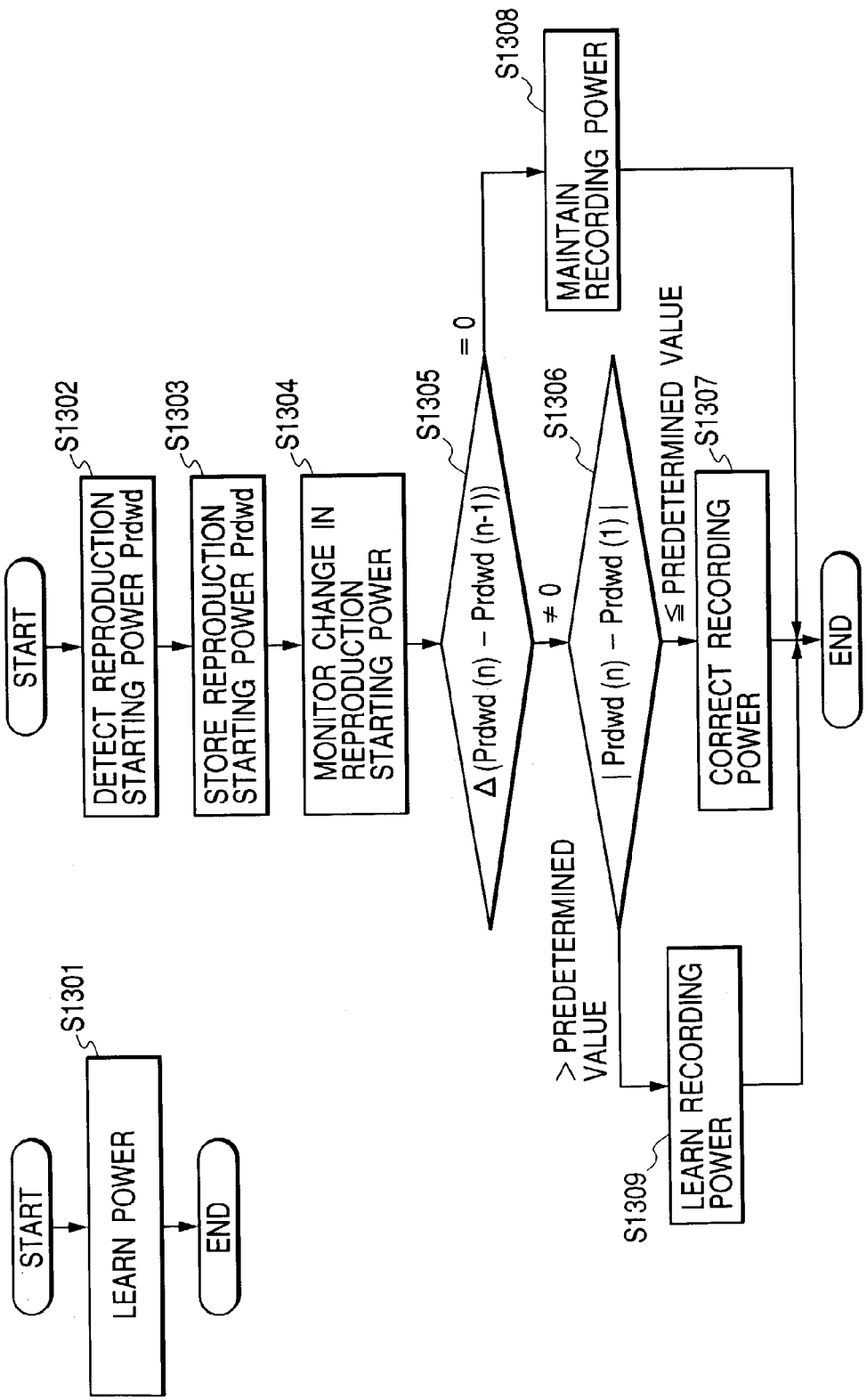

A third embodiment of the present invention is described below in detail by referring to the accompanying drawings. In the third embodiment, a recording power is optimized by monitoring a change in the "DWDD reproduction starting power (Prdwd) described above. FIGS. 13-1 and 13-2 are flowcharts showing the whole operation of an optimum-recording-power adjusting method according to this embodiment and a control flow on the flowchart is described below in detail by referring to the figures.

(Start Sequence: FIG. 13-1)

[Step S1301: Power Learning]

Predetermined power learning is first performed in a predetermined region of a disk when starting an apparatus or replacing disks (step S1301) to set a recording-power initial value Pw(0) and reproducing power initial value Pr(0). These values are obtained by a normal power adjusting step. Moreover, a DWDD-reproduction starting power initial value Prdwd(0) is detected to perform initialization.

(Recording-Power Adjusting Sequence: FIG. 13-2)

[Steps S1302 and S1303: Detection and Storage of DWDD Reproduction Starting Power]

A disk controller 230 detects a DWDD reproduction starting power in accordance with a predetermined intermittent-operation timing. A reproducing signal processing section 228 is first controlled by the disk controller 230 in step S1302 to measure a DWDD reproduction starting power Prdwd on the basis of the data immediately after recording. The obtained DWDD reproduction starting power is stored in the register (step S1303). Thereafter, step S1304 is started.

[Steps S1304 and S1305: Monitoring of Change of DWDD Reproduction Starting Power]

In step S1304, a change of the DWDD reproduction starting power is monitored. Specifically, the difference component $\Delta Prdwd(n-1)$ between the value Prdwd(n) calculated at present time and the value Prdwd(n-1) calculated at the last time is calculated.

$$\Delta Prdwd(n)=Prdwd(n)-Prdwd(n-1)$$

Thereafter, in step S1305, it is determined whether $\Delta Prdwd(n)$ is equal to 0 or not. In this case, when $\Delta Prdwd(n)$ is equal to 0, that is, the DWDD reproduction starting power is not changed, step S1308 is started to complete the processing without changing the recording power. On the other hand, when $\Delta Prdwd(n)$ is not equal to 0, step S1306 is started.

[Step S1306: Determination of Total Change Value of Prdwd]

In step S1306, the difference $|Prdwd(n)-Prdwd(0)|$ between the DWDD reproduction starting power Prdwd(n) calculated at present in step S1305 and the DWDD-reproduction starting power initial value Prdwd(0) calculated in step S1301 is calculated. Then, when there is a variation satisfying the relation $|Prdwd(n)-Prdwd(0)|>\gamma$ ($\gamma$ is a constant), step S1309 is started to re-execute recording-power learning. To the contrary, when $|Prdwd(n)-Prdwd(0)|$ is equal to or less than $\gamma$, step S1307 is started.

[Step S1309: Recording-power Learning]

In step S1309, recording-power learning is performed, an optimum recording power is set, and then the processing is completed.

[Step S1307: Correction of Optimum Recording Power]

In step S1307, an actual recording power is corrected depending on a change in the DWDD reproduction starting power without performing power learning. Then, the processing is completed.

Figure 14:
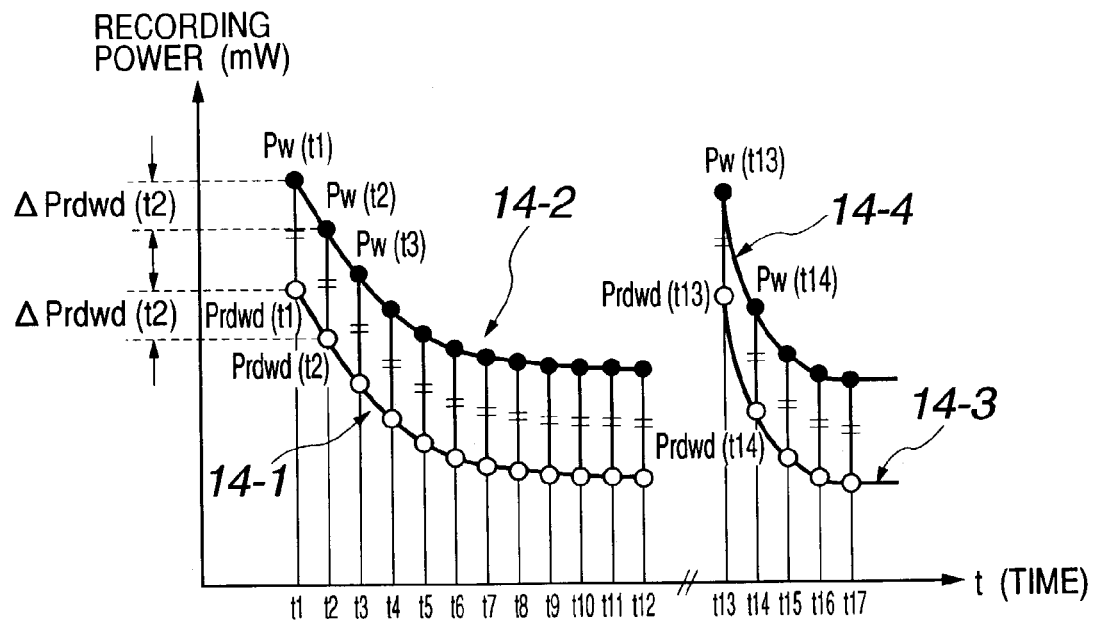
FIG. 14 is a graphical representation for explaining automatic calibration of a recording power relating to the present invention.

FIG. 14 shows states of time transition in correction of a recording power. In FIG. 14, the axis of abscissa denotes time and the axis of coordinate denotes recording power. It is assumed that an apparatus in accordance with this embodiment is started at a certain time (before t1), a DWDD reproduction starting power is monitored at the times t1, t2, t3, . . . , and at the same time, an optimum recording power is set. 14-1 shows the time transition of the DWDD reproduction starting power Prdwd (plotted with white circles). 14-2 shows the time transition of an optimum-recording-power set value (plotted with black circles).

In this case, it is assumed that the DWDD reproduction starting power detected at the time t1 is Prdwd(t1) and then, the DWDD reproduction starting power detected at the time t2 is Prdwd(t2). The DWDD reproduction starting power is decreased by $\Delta Prdwd(t2)=|Prdwd(t2)-Prdwd(t1)|$ between the time t1 and the time t2. This is because the temperature inside the apparatus rises on operation and the region of the isothermal line Ts formed on the switching layer on the disk 201 becomes able to be achieved at a lower reproducing power.

Therefore, at the time t2, the optimum recording power Pw(t1) is corrected by $\Delta Prdwd(t2)$ which is the amount of change in the DWDD reproduction starting power.

$$Pw(t2)=Pw(t1)+\Delta Prdwd(t2)$$

Subsequently similarly, the optimum recording power is corrected depending on the amount of change in the DWDD reproduction starting power.

$$Pw(t3)=Pw(t2)+\Delta Prdwd(t3)$$

$$Pw(tk)=Pw(tk-1)+\Delta Prdwd(tk)(1 \leq k \leq n)$$

As shown in FIG. 14, the set value of the actual optimum recording power is corrected proportionally to a change of the DWDD reproduction starting power. There is a tendency that the temperature rise in the apparatus is saturated approximately at time t5 and the variation of the DWDD reproduction starting power converges, but it is also possible to optimize the set value of the optimum recording power following the above dynamic variation.

14-3 and 14-4 are obtained by schematically plotting states of newly setting a disk of a temperature corresponding to an outside-air temperature to a magneto-optical disk drive having an inside temperature raised up to a given value and making the drive perform recording. 14-3 shows the time transition of the DWDD reproduction starting power Prdwd (plotted with white circles). 14-4 shows the time transition of the set value of the optimum-recording power (plotted with black circles).

After replacing the disks, the DWDD reproduction starting power Prdwd(t1) is detected at the time t13 while the optimum recording power Pw(13) obtained through recording-power learning is set. Then, the DWDD reproduction starting power Prdwd(t14) is detected at the time t14. The DWDD reproduction starting power is decreased by $\Delta Prdwd(t14)=|Prdwd(t14)-Prdwd(t13)|$ between the time t13 and the time t14. This is because the temperature of the disk magnetic film was a temperature corresponding to the outside-air temperature immediately after replacing the disks but rapidly rose due to a high-temperature environment in the apparatus and the region of the isothermal line Ts formed on the switching layer on the disk became able to be achieved at a lower reproducing power. Therefore, at the time t14, the optimum recording power Pw(t13) is corrected by ΔPrdwd(t14) which is the amount of change in the DWDD reproduction starting power.

$$Pw(t14)=Pw(t13)+\Delta Prdwd(t14)$$

Subsequently similarly, an optimum recording power is corrected depending on the amount of change in the DWDD reproduction starting power. Thus, the correction of the optimum recording power in step S1307 is performed. Then, the processing is finished.

(Fourth Embodiment)

(Control Flow of Optimum Recording Power by Fourth Embodiment)

Figure 19:
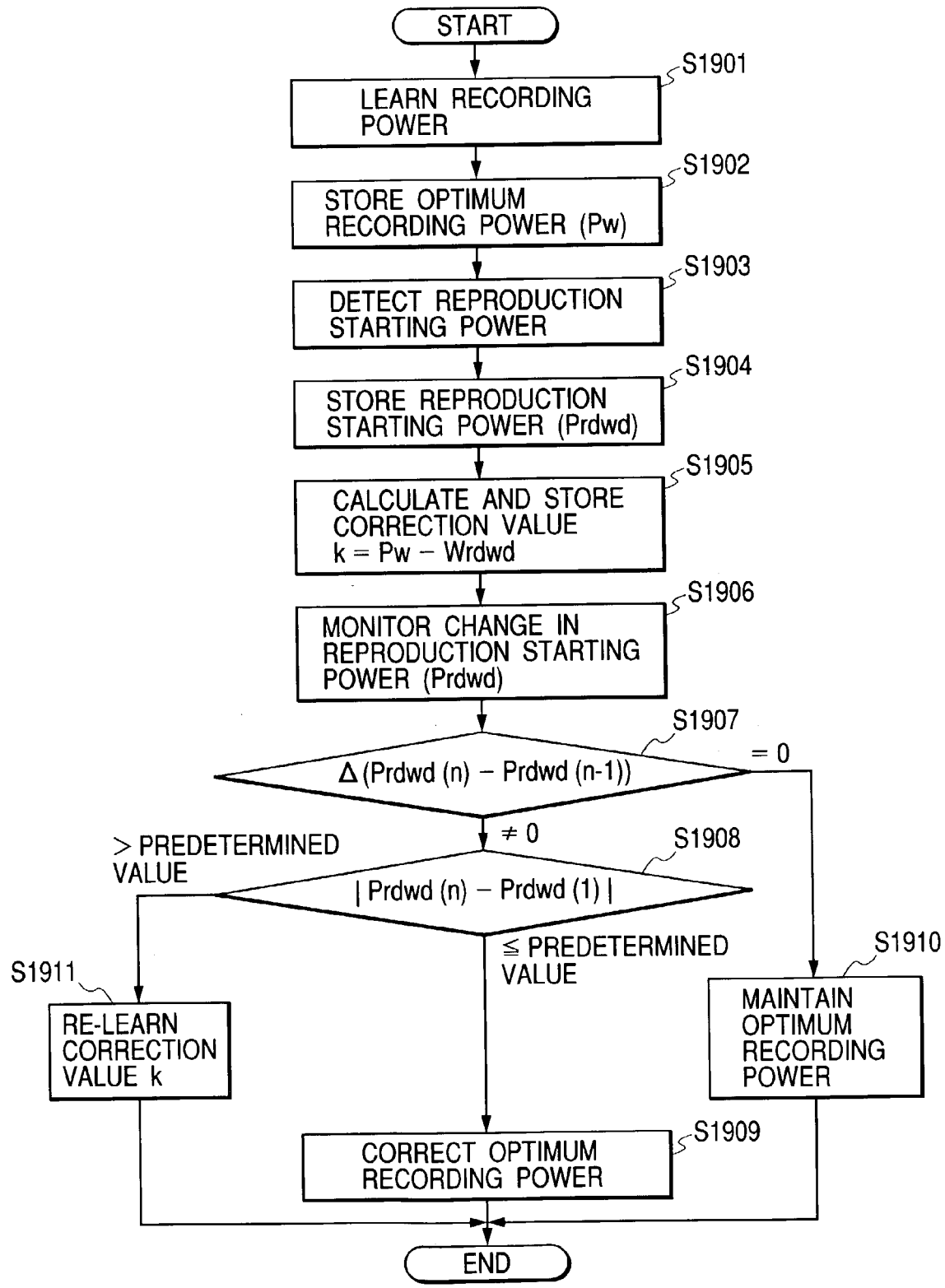
FIG. 19 is a flowchart showing operations of a fourth embodiment of the present invention.

In this embodiment, the ratio k between the optimum recording power (Pw) and the DWDD reproduction starting power (Prdwd) is obtained in a predetermined test region and stored in a register and a recording power is optimized depending on a change in the DWDD reproduction starting power (Prdwd). FIG. 19 is a flowchart showing the whole operation of an optimum-recording-power adjusting method in accordance with this embodiment and a control flow on the flowchart is described below in detail by referring to the figure.

[Steps S1901 and S1902: Learning and Storage of Optimum Recording Power]

A disk controller 230 makes an optical head 240 seek a predetermined test region on a disk 201 and learns an optimum recording power (Pw) (step S1901). The obtained optimum recording power is stored in the register (step S1902).

[Steps S1903 and S1904: Detection and Storage of DWDD Reproduction Starting Power]

Then, a DWDD reproduction starting power (Prdwd) in the region designated for reproduction is calculated under the control by the disk controller 230 (step S1803). The obtained DWDD reproduction starting power is stored in the register (step S1804).

[Step S1905: Calculation and Storage of Correction Value k]

The ratio between the optimum recording power (Pw) and DWDD reproduction starting power (Prdwd) stored in the register is calculated. In the case of this embodiment, k=(Pw)−(Prdwd) is obtained and stored in the register.

[Steps S1906 and S1907: Monitoring of Change of DWDD Reproduction Starting Power]

In step S1906, a change in the DWDD reproduction starting power is monitored. Specifically, the difference component ΔPrdwd(n) between the value Prdwd(n) calculated at present time and the value Prdwd(n−1) calculated at the last time is calculated.

$$\Delta Prdwd(n)=Prdwd(n)-Prdwd(n-1)$$

Then, in step S1907, it is determined whether ΔPrdwd(n) is 0 or not. When ΔPrdwd(n) is equal to 0, that is, the DWDD reproduction starting power is not changed, step S1910 is started to complete the processing without changing the optimum recording power. On the other hand, when ΔPrdwd (n) is not equal to 0, step S1908 is started.

[Step S1908: Determination of Total Change Value of Prdwd]

In step S1908, the difference |Prdwd(n)−Prdwd(1)| between the DWDD reproduction starting power Prdwd(n) calculated at present time and the DWDD reproduction starting power Prdwd(1) calculated at the first time is calculated. Then, when there is a variation satisfying the relation |Prdwd(n)−Prdwd(1)|>ϵ (ϵ is a constant), step S1911 is started to re-learn the correction value k. To the contrary, when |Prdwd(n)−Prdwd(1)| is equal to or less than ϵ, step S1909 is started to correct the optimum recording power.

[Step S1909: Correction of Optimum Recording Power]

In step S1909, the correction value k previously stored in the register is added to the DWDD reproduction starting power Prdwd(n).

That is, by correcting Pw(n) such that Pw(n) is equal to Prdwd(n)+k, an actual recording power is corrected without executing a power-learning step.

Incidentally, in step S1905, the difference between (Pw) and (Prdwd) is used as the correction value k, but the value k is not restricted to the difference and it is also possible to use the ratio between (Pw) and (Prdwd) as the value k.

As can be seen through the preferred embodiments of the present invention described above, the monitoring timing of the DWDD reproduction starting power is generalized and controlled by the disk controller 230. In this case, it is a matter of course to perform a design so as to improve the following accuracy by further advancing the monitoring timing than the timing in the normal state, under a situation such that a great dynamic variation to recording/reproduction may occur in view of the magnitude of a fluctuation value of the DWDD reproduction starting power immediately after turning on an apparatus or replacing disks. However, under the normal operation, at the time when recording/reproduction is stand-by, or the fluctuation value of the DWDD reproduction starting power is small, it is a matter of course to perform a design so as to contribute to power saving by further intermitting the monitoring timing than the normal state and decreasing the monitoring frequency.

Moreover, in the case of the above embodiments, the reproducing power is corrected by monitoring the amount of change in the DWDD reproduction starting power, but it is also possible to correct the power by using a temperature sensor set in a unit and thereby monitoring a temperature change more than a predetermined value. Furthermore, when the temperature inside the apparatus greatly fluctuates, it is also possible to perform a design so as to improve the following accuracy by further advancing the monitoring timing than the normal state. To the contrary, when the temperature inside the apparatus does not greatly fluctuate, that is, the DWDD reproduction starting power slightly fluctuates, it is also possible to perform a design so as to contribute to power saving by further intermitting the monitoring timing than the normal state.

Moreover, for the preferred embodiments of the present invention, the constitution using a hardware is described, but the present invention is not restricted thereto and it is a matter of course that the present invention can be realized through program processing by a software.

What is claimed is:

1. A magneto-optical recording/reproducing apparatus for reproducing information by irradiating a magneto-optical recording medium with a light beam in a spot fashion to change a magnetized state in the spot, comprising:
    means for detecting a light beam power by which a change in the magnetized state starts;
    means for learning a reproducing light beam power; and
    means for calculating and storing either a difference or a ratio between a light beam power by which a change in the magnetized state starts and the reproducing light beam power obtained through the means for learning, wherein when resetting the reproducing light beam power, the reproducing light beam is set by newly detecting the light beam power by which a change in the magnetized state starts, and using the newly detected light beam power and the said stored difference or ratio.

2. The magneto-optical recording/reproducing apparatus according to claim 1, wherein the learning means sets upper and lower limits of the reproducing light beam power on the basis of the detected light beam power, performs learning within the range of the upper and lower limits, and detects an optimum reproducing light beam power.

3. The magneto-optical recording/reproducing apparatus according to claim 1, further comprising means for monitoring a change in the detected light beam power, wherein the reproducing light beam power is reset when the monitoring means detects a change of a predetermined value.

4. The magneto-optical recording/reproducing apparatus according to claim 1, further comprising means for detecting a temperature change, wherein the reproducing light beam power is reset when the temperature-change detecting means detects a temperature change of a predetermined value.

5. The magneto-optical recording/reproducing apparatus according to claim 1, wherein the resetting is performed at fixed periods of time.

6. The magneto-optical recording/reproducing apparatus according to claim 3, wherein the said difference or ratio is newly calculated when the change in the detected light beam power exceeds a second predetermined value so set as to be more than the former predetermined value.

7. The magneto-optical recording/reproducing apparatus according to claim 4, wherein the said difference or ratio is newly calculated when the temperature change exceeds a second predetermined value so set as to be more than the former predetermined value.

8. The magneto-optical recording/reproducing apparatus according to claim 1, wherein the magneto-optical recording medium is a domain wall moving magneto-optical recording medium.

9. The magneto-optical recording/reproducing apparatus according to claim 1, wherein the magneto-optical recording medium is an MSR magneto-optical recording medium.

10. A magneto-optical recording/reproducing apparatus for reproducing information by irradiating a magneto-optical recording medium with a light beam in a spot fashion to change a magnetized state in the spot and recording an information while irradiating the medium with a light beam, comprising:

means for learning a recording light beam power; and means for calculating and storing either a difference or a ratio between a detected light beam power for starting a change in the magnetized state and the recording light beam power obtained through the means for learning, wherein when resetting the recording light beam power, the recording light beam is set by newly detecting the light beam power for starting a change in the magnetized state, and using the newly detected light beam power and the said stored difference or ratio.

11. A magneto-optical recording/reproducing apparatus for reproducing information by irradiating a magneto-optical recording medium with a light beam in a spot fashion to change a magnetized state in the spot and recording an information while irradiating the medium with a light beam, comprising:

means for detecting a light beam power by which a change in the magnetized state starts;

means for detecting a difference between a value of the detected light beam power by which a change in the magnetized state starts and a value of the detected light beam power previously detected; and means for resetting the reproducing power or recording power, wherein the resetting means resets the reproducing power or recording power when the means for detecting the difference detects a change of a predetermined value.

* * * * *

UNITED STATES PATENT AND TRADEMARK OFFICE
CERTIFICATE OF CORRECTION

| | |
|---|---|
| PATENT NO. | : 7,020,049 B2 |
| APPLICATION NO. | : 10/421701 |
| DATED | : March 28, 2006 |
| INVENTOR(S) | : Toshihiko Suzuki et al. |

It is certified that error appears in the above-identified patent and that said Letters Patent is hereby corrected as shown below:

ON THE TITLE PAGE AT [57] ABSTRACT:

Line 3, "wit" should read --with--.

SHEET 6

"TRAVERING" should read --TRAVELING--.

SHEET 11

"AJDUSTMENT" should read --ADJUSTMENT--.

COLUMN 2

Line 3, "are" should read --have been--; and
    Line 45, "are" should read --have--.

COLUMN 4

Line 16, "leaning" should read --learning--.

COLUMN 5

Line 12, "serve" should read --servo--.

COLUMN 10

Line 28, "An" should read --$A_n$--; and
    Line 52, "Leaning)" should read --Learning)--.

COLUMN 11

Line 42, "level $E^{th}$" should read --level $E_{th}$--; and
    Line 43, "$_4$." should read --$^4$.--.

UNITED STATES PATENT AND TRADEMARK OFFICE
CERTIFICATE OF CORRECTION

PATENT NO. : 7,020,049 B2
APPLICATION NO. : 10/421701
DATED : March 28, 2006
INVENTOR(S) : Toshihiko Suzuki et al.

It is certified that error appears in the above-identified patent and that said Letters Patent is hereby corrected as shown below:

COLUMN 17

Line 8, "(Prdwd)" should read --(Prdwd)"--.

Signed and Sealed this

Seventeenth Day of October, 2006

JON W. DUDAS
*Director of the United States Patent and Trademark Office*